(12) United States Patent
Smith et al.

(10) Patent No.: US 12,515,402 B2
(45) Date of Patent: Jan. 6, 2026

(54) HIGHLY ALIGNED FIBER NOZZLE FOR ADDITIVE MANUFACTURING APPLICATIONS

(71) Applicant: UT-Battelle, LLC, Oak Ridge, TN (US)

(72) Inventors: Tyler C. Smith, Knoxville, TN (US); Ahmed A. Hassen, Knoxville, TN (US); John M. Lindahl, Powell, TN (US); Seokpum Kim, Knoxville, TN (US); Vlastimil Kunc, Knoxville, TN (US); Vipin Kumar, Knoxville, TN (US); Chase Joslin, Madisonville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 153 days.

(21) Appl. No.: 18/375,053

(22) Filed: Sep. 29, 2023

(65) Prior Publication Data

US 2024/0383196 A1 Nov. 21, 2024

Related U.S. Application Data

(60) Provisional application No. 63/467,607, filed on May 19, 2023, provisional application No. 63/467,606, filed on May 19, 2023.

(51) Int. Cl.
*B29C 64/209* (2017.01)
*B01F 23/50* (2022.01)
(Continued)

(52) U.S. Cl.
CPC ............ *B29C 64/209* (2017.08); *B01F 23/51* (2022.01); *B01F 25/45211* (2022.01);
(Continued)

(58) Field of Classification Search
CPC ... B29C 64/106; B29C 64/112; B29C 64/118; B29C 64/124; B29C 64/165;
(Continued)

(56) References Cited

U.S. PATENT DOCUMENTS

| 3,942,765 A | 3/1976 | Henrickson |
| 2014/0014270 A1 | 1/2014 | Shah et al. |
| 2020/0061910 A1* | 2/2020 | Lewis .................... D06M 11/74 |

FOREIGN PATENT DOCUMENTS

DE 102022134439 A1 6/2024

OTHER PUBLICATIONS

<https://www.promix-solutions.com/en/mixing>; accessed Aug. 30, 2023.
(Continued)

*Primary Examiner* — JaMel M Nelson
(74) *Attorney, Agent, or Firm* — Fox Rothschild LLP

(57) ABSTRACT

An additive manufacturing system for an additive manufacturing material and embedded short-chopped fibers includes an extruder comprising a nozzle having a nozzle flow channel. The nozzle includes a plurality of spaced apart elongated aligning structures distributed inside the nozzle flow channel and parallel to the longitudinal center axis defining alignment flow channels within the nozzle flow channel. A nozzle for additive manufacturing, a method of additive manufacturing, and a method of making a nozzle for an additive manufacturing system for and additive manufacturing material and embedded short-chopped fibers are also disclosed.

11 Claims, 23 Drawing Sheets

(51) Int. Cl.
- *B01F 25/452* (2022.01)
- *B01F 25/46* (2022.01)
- *B29B 7/32* (2006.01)
- *B29C 64/106* (2017.01)
- *B29C 64/165* (2017.01)
- *B29C 64/314* (2017.01)
- *B29C 64/336* (2017.01)
- *B33Y 10/00* (2015.01)
- *B33Y 30/00* (2015.01)
- *B33Y 40/00* (2020.01)
- *B29K 105/14* (2006.01)
- *B33Y 40/10* (2020.01)

(52) U.S. Cl.
CPC .............. *B01F 25/46* (2022.01); *B29B 7/325* (2013.01); *B29C 64/106* (2017.08); *B29C 64/165* (2017.08); *B29C 64/314* (2017.08); *B29C 64/336* (2017.08); *B33Y 10/00* (2014.12); *B33Y 30/00* (2014.12); *B33Y 40/00* (2014.12); *B29K 2105/14* (2013.01); *B33Y 40/10* (2020.01)

(58) Field of Classification Search
CPC ... B29C 64/209; B29C 64/307; B29C 64/314; B29C 64/321; B29C 64/336; B29K 2105/12; B29K 2105/122; B29K 2105/124; B29K 2105/126; B29K 2105/14

See application file for complete search history.

(56) References Cited

OTHER PUBLICATIONS

Kennedy et al.: "Printing Polymer Blends Through in situ Active Mixing During Fused Filament Fabrication"Additive Manufacturing, vol. 36, Dec. 2020, 101233.

Lan et al.: "Active Mixing Nozzle for Multi-Material and Multi-Scale 3D Printing", Proceedings of the ASME 2017 12th International Manufacturing Science and Engineering Conference MSEC2017 Jun. 4-8, 2017, Los Angeles, CA, USA.

* cited by examiner

HIGHLY ALIGNED FIBER NOZZLE FOR ADDITIVE MANUFACTURING APPLICATIONS

CROSS-REFERENCE TO RELATED APPLICATIONS

This application claims priority to U.S. Provisional Patent Application No. 63/467,606 filed May 19, 2023, titled "STATIC MIXING NOZZLES FOR LONG FIBER AND RESIN MIXING AND DISPERSING IN POLYMER ADDITIVE MANUFACTURING", and U.S. Provisional Patent Application No. 63/467,607 filed May 19, 2023, titled "STATIC MIXING NOZZLES FOR FIBER RANDOMIZATION IN LARGE SCALE ADDITIVE MANUFACTURING APPLICATIONS", the entire disclosures of which are incorporated herein by reference. This application is related to U.S. Utility patent application Ser. No. 18/375,019 entitled "Static Mixing Nozzles for Long Fiber and Resin Mixing and Dispersing in Polymer Additive Manufacturing", and U.S. Utility patent application Ser. No. 18/375,085 for "Static Mixing Nozzles for Fiber Randomization in Large Scale Additive Manufacturing Applications", both filed on even date herewith, the entire disclosures of which are hereby incorporated fully by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates generally to additive manufacturing, and more particularly to nozzles for extruders used in additive manufacturing with additive manufacturing materials incorporating fibers.

BACKGROUND OF THE INVENTION

Static mixers are conventionally used to disperse multiple materials and mix them together to create hybrid mixtures. Mixers are also used as conventional practice in reactive polymer systems to mix hardeners with resin to allow for curing.

Conventional large scale additive manufacturing (AM) is conducted by melting thermoplastic polymers through a single screw extruder to produce a part in a layer-by-layer process. Non-filled polymers tend to have issues such as cracking, warping, and lower stiffness and lead to part failures. As such, short-chopped fibers are added to stiffen the material to prevent failure both during and after the print while also significantly increasing the mechanical stiffness and strength. During extrusion some of the fibers tend to align in the direction of the deposition from shear in the nozzle at the nozzle wall. The presence of highly aligned fibers along the extrusion direction is concentrated at the outer perimeters of the bead and forms a skin containing aligned fibers, while the core of the bead has random fiber orientation. The size of the skin and the core zones are highly dependent on the size of the nozzle.

Highly aligned fibers in the print direction result in the printed part exhibiting a low coefficient of linear thermal expansion (CLTE), high stiffness, high strength and thermal properties in the print direction while the other two directions experience lower mechanical properties with higher CLTE properties. CLTE is a critical material property that should be considered during the design phase for applications such as tooling, one of the most highlighted applications for large scale additive manufacturing technology. There are applications where high degrees of anisotropy are desired throughout the bead such as autoclave tooling, core shell structures, and bending applications.

SUMMARY OF THE INVENTION

An additive manufacturing system for an additive manufacturing material and embedded short-chopped fibers includes an extruder including a nozzle having a nozzle flow channel defined by a channel wall. The nozzle flow channel has a longitudinal center axis, a diameter $D_{FC}$, and a length $L_{FC}$, an input end and an opposing output end. The nozzle flow channel can be fluidly coupled at the input end to feeding means through which additive manufacturing material and short-chopped fibers are to be provided to the extruder. The nozzle includes a plurality of spaced apart elongated aligning structures distributed inside the nozzle flow channel and parallel to the longitudinal center axis. The aligning structures have a length $L_{AS}$, a width $W_{AS}$ and a thickness $T_{AS}$, and defining alignment flow channels within the nozzle flow channel.

The nozzle is configured to guide a bead of the additive manufacturing material and short-chopped fibers from the input end to the output end of the nozzle flow channel through the alignment flow channels, to align the orientations of the short-chopped fiber with the longitudinal axis center axis of the channel and create an aligned bead, and extrude the aligned bead through the output end. The aligned bead is deposited as part of a layer of an object being formed by the additive manufacturing system. The nozzle flow channel in one embodiment can be tubular.

The length of the aligning structures $L_{AS}$ can be from 20% to 100% of the length $L_{FC}$ of the nozzle flow channel. The width $W_{AS}$ of the aligning structures can be from 10% to 100% of the flow channel diameter $D_{FC}$. The nozzle can have 2 to 100 alignment flow channels.

The aligning structures can be concentric tubes. The aligning structures can include parallel plates. The aligning structures can include conduits. Each conduit defines an alignment flow channel. The alignment flow channels can be parallel to each other. The conduits can be adjacent polygonal conduits. The conduits can be a plurality of adjacent tubes.

The bead can have a skin thickness $T_{SK}$. The alignment flow channels can have a lateral dimension of from 0.1 to 2.5 $T_{SK}$.

A method of additive manufacturing with an additive manufacturing material and embedded short-chopped fibers can include the step of providing an extruder comprising a nozzle having a nozzle flow channel defined by a channel wall. The nozzle flow channel has a longitudinal center axis, a diameter $D_{FC}$, and a length $L_{FC}$, an input end and an opposing output end. The nozzle flow channel can be fluidly coupled at the input end to feeding means through which additive manufacturing material and short-chopped fibers are to be provided to the extruder. The nozzle includes a plurality of spaced apart elongated aligning structures distributed inside the nozzle flow channel and parallel to the longitudinal center axis. The aligning structures have a length $L_{AS}$, a width $W_{AS}$ and a thickness $T_{AS}$, and define alignment flow channels within the nozzle flow channel.

A bead of the additive manufacturing material and short-chopped fibers is guided from the input end to the output end of the nozzle flow channel through the alignment flow channels. This aligns the orientations of the short-chopped fiber with the longitudinal axis center axis of the channel and create an aligned bead. The aligned bead is extruded through the output end, causing the aligned bead to be deposited as part of a layer of an object being formed by the additive manufacturing system.

A method of making a nozzle for additive manufacturing with an additive manufacturing material and embedded short-chopped fibers includes the step of providing a test nozzle having a test flow channel having a diameter $D_{TFC}$. An additive manufacturing material and short-chopped fibers are flowed through the test flow channel of the test nozzle and an extruded bead of the additive manufacturing material and short-chopped fibers is drawn. The bead has a core of additive manufacturing material and randomized short-chopped fibers, and a skin comprising aligned short chop fibers. The thickness of the skin $T_{SK}$ is measured.

An additive manufacturing nozzle is created having an additive manufacturing flow channel defined by a channel wall. The nozzle flow channel has a longitudinal center axis, a diameter $D_{MFC}$, and a length $L_{MFC}$, an input end and an opposing output end. The manufacturing nozzle flow channel is fluidly coupled at the input end to feeding means through which additive manufacturing material and short-chopped fibers are provided to the extruder. The additive manufacturing nozzle includes a plurality of spaced apart elongated aligning structures distributed inside the manufacturing nozzle flow channel and parallel to the longitudinal center axis. The aligning structures have a length $L_{AS}$, a width $W_{AS}$ and a thickness $T_{AS}$, and defining alignment flow channels within the nozzle flow channel having a width $W_{AFC}$. A plurality of the aligning structures are distributed inside the flow channel, parallel to the longitudinal center axis. The nozzle flow channel width $W_{AFC}$ is from 0.1 to 2.5 $T_{SK}$.

A nozzle for additive manufacturing with an additive manufacturing material and embedded short-chopped fibers includes a nozzle flow channel defined by a channel wall. The nozzle flow channel has a longitudinal center axis, a diameter $D_{FC}$ and a length $L_{FC}$, an input end and an opposing output end. The nozzle includes a plurality of spaced apart elongated aligning structures distributed inside the nozzle flow channel and parallel to the longitudinal center axis. The aligning structures have a length $L_{AS}$, a width $W_{AS}$ and a thickness $T_{AS}$, and defining alignment flow channels within the nozzle flow channel.

BRIEF DESCRIPTION OF THE DRAWINGS

There are shown in the drawings embodiments that are presently being understood that the invention is not limited to the arrangements and instrumentalities shown, wherein.

DETAILED DESCRIPTION OF THE INVENTION

Figure 1:
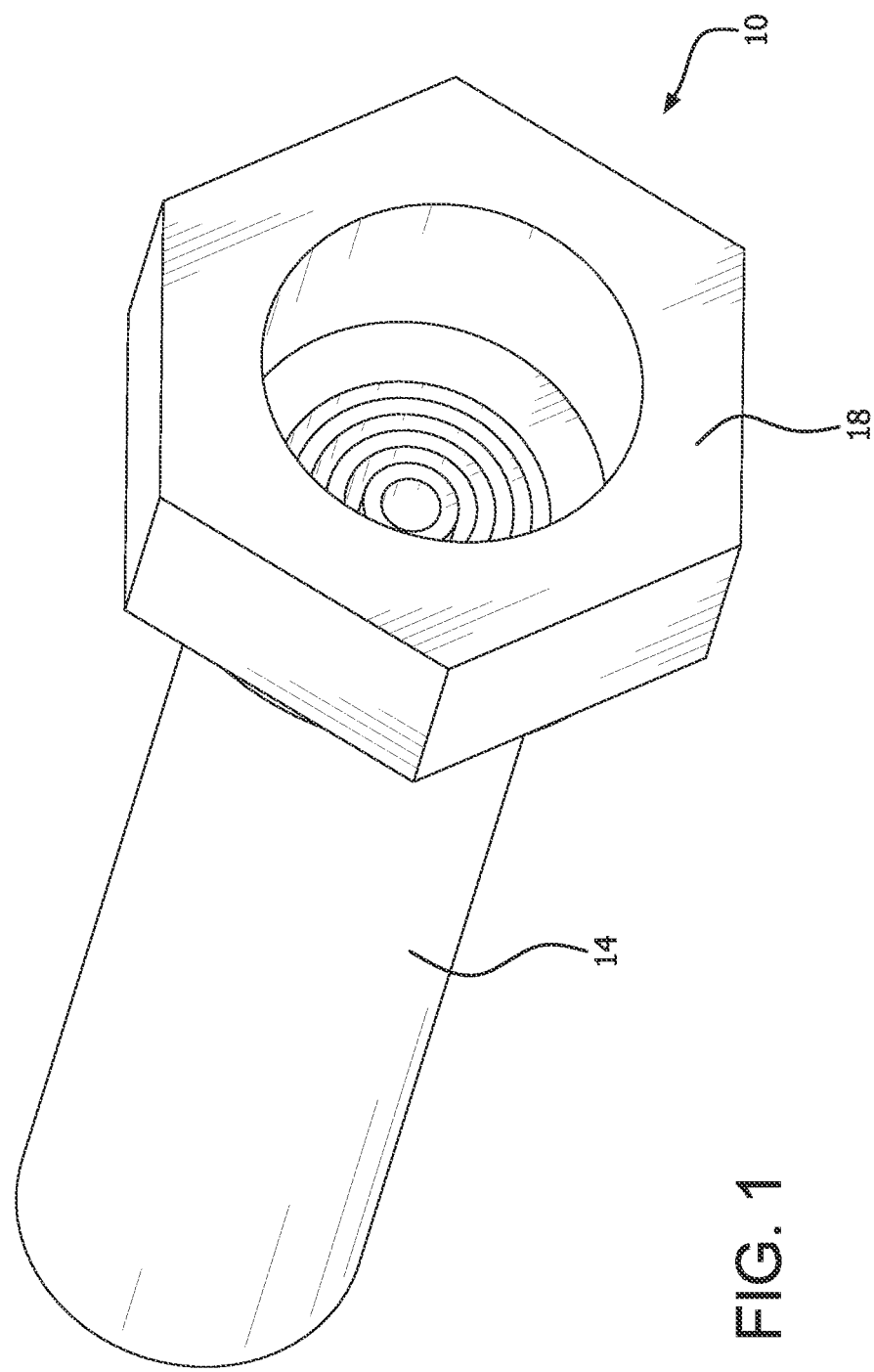
FIG. 1 is a perspective view of a highly aligned fiber nozzle.
Figure 2:
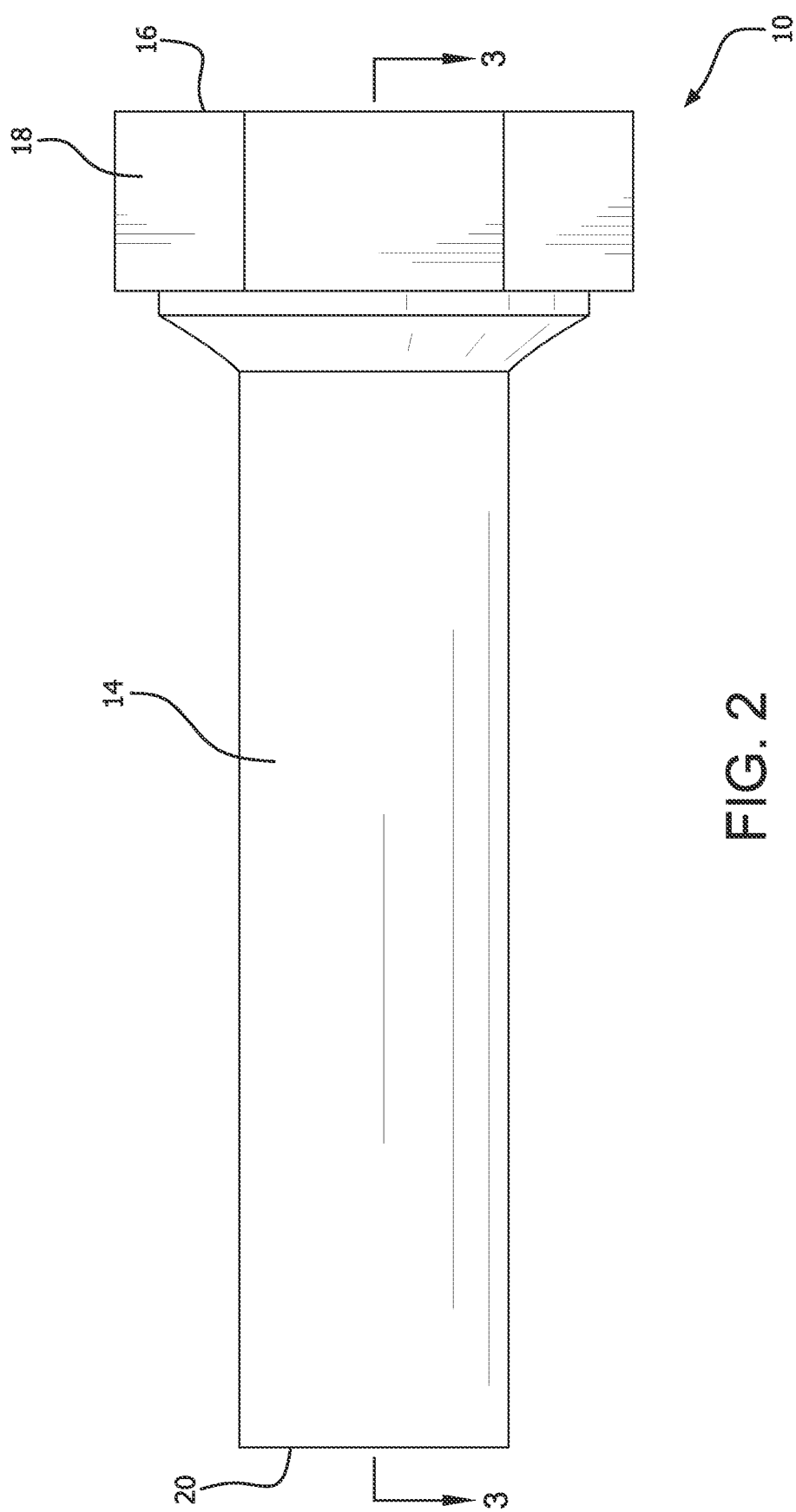
FIG. 2 is a side elevation.
Figure 3:
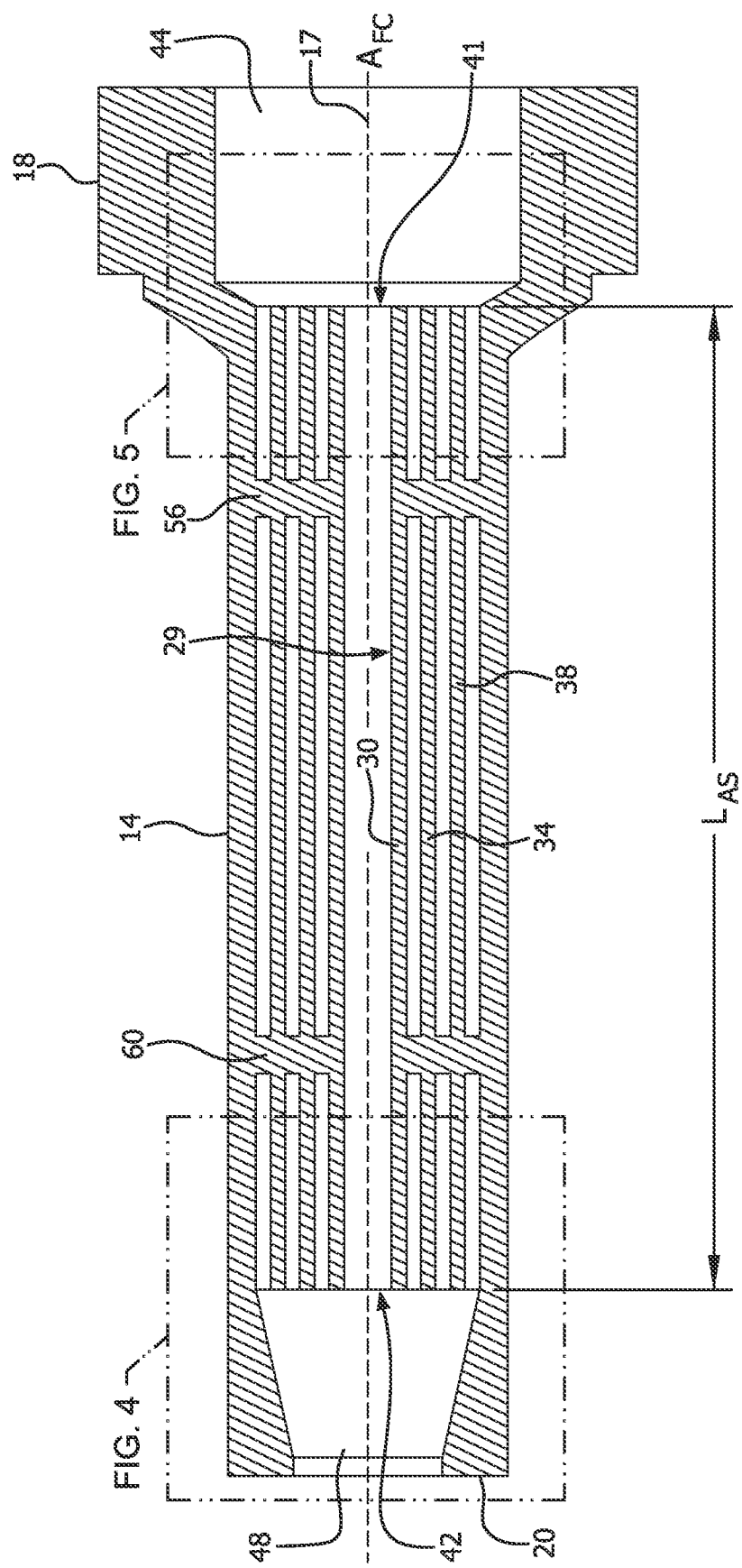
FIG. 3 is a cross section taken along line 3-3 in FIG. 2.
Figure 4:
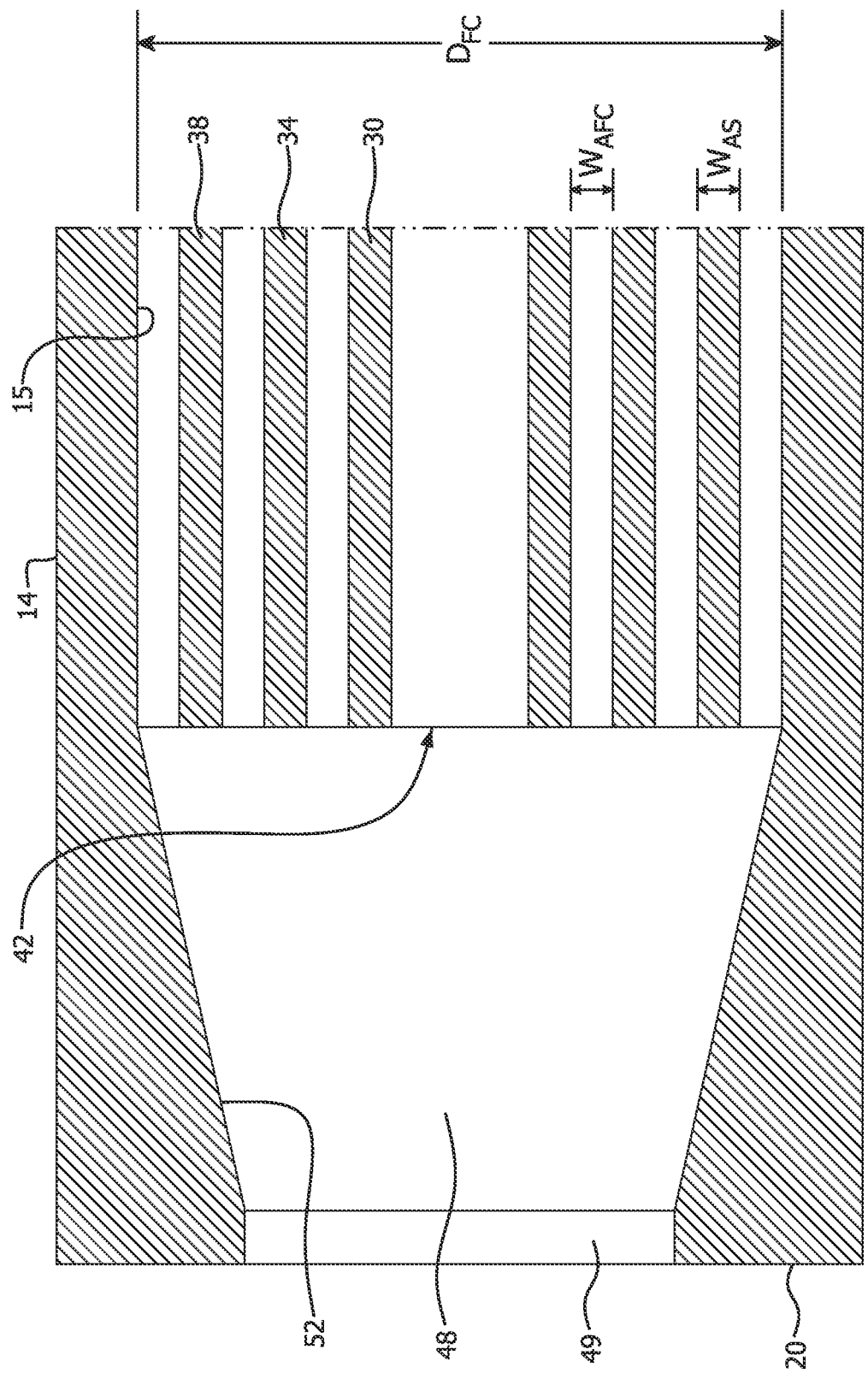
FIG. 4 is an expanded view of area FIG. 4 in FIG. 3.

An additive manufacturing system for an additive manufacturing material and embedded short-chopped fibers includes an extruder comprising a nozzle having a nozzle flow channel defined by a channel wall. The nozzle flow channel has a longitudinal center axis $A_{FC}$, a diameter $D_{FC}$, and a length $L_{FC}$, an input end and an opposing output end. The nozzle flow channel is fluidly coupled at the input end to feeding means through which additive manufacturing material and short-chopped fibers are to be provided to the extruder. The nozzle comprises a plurality of spaced apart elongated aligning structures distributed inside the nozzle flow channel and parallel to the longitudinal center axis. The aligning structures having a length $L_{AS}$, a width $W_{AS}$ and a thickness $T_{AS}$, and define alignment flow channels within the nozzle flow channel.

The nozzle is configured to guide a bead of the additive manufacturing material and short-chopped fibers from the input end to the output end of the nozzle flow channel through the alignment flow channels. The passage through the alignment flow channels aligns the orientations of the short-chopped fiber with the longitudinal axis center axis of the channel and creates an aligned bead. The aligned bead is extruded through the output end of the nozzle, causing the aligned bead to be deposited as part of a layer of an object being formed by the additive manufacturing system.

The nozzle can have different shapes. The nozzle flow channel can be tubular. The nozzle can have other shapes, for example oval, or a geometrical shape such as square, triangular or hexagonal.

The length of the aligning structures $L_{AS}$ can vary. The length of the aligning structures $L_{AS}$ can be from 20% to 100% of the length $L_{FC}$ of the nozzle flow channel. The length of the aligning structures $L_{AS}$ can be 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100% of the length $L_{FC}$ of the nozzle flow channel, and can be within a range of any high value and low value selected from these values.

The fibers suitable for use with this invention can vary. Some of these fibers can consist of short-chopped carbon fiber, glass fiber, bio-fibers, basalt fibers, or high aspect ratio particulates. These fibers can range in length from 1-500 um and a diameter of 1-200 um.

The width $W_{AS}$ of the aligning structures is from 10% to 100% of the flow channel diameter $D_{FC}$. The width of the aligning structures can be 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100% of the flow channel diameter $D_{FC}$, and can be within a range of any high value and low value selected from these values.

The number of alignment flow channels can vary. The number of alignment flow channels can be 2-100 alignment flow channels. The number of alignment flow channels can be 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100, and can be within a range of any high value and low value selected from these values.

The aligning structures can take a variety of different shapes. The aligning structures can be concentric tubes. The aligning structures can be parallel plates. The aligning structures can comprise conduits, where each conduit defines an alignment flow channel, and the alignment flow channels are parallel to each other. The conduits can include adjacent polygonal conduits. The conduits can include a plurality of adjacent tubes.

The bead can have a skin thickness $T_{SK}$. The alignment flow channels can have a width or lateral dimension of from 0.1 to 2.5 $T_{SK}$. The alignment flow channels can have a lateral dimension of 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2, 2, 2.3, 2.4, or 2.5 $T_{SK}$, and can have a lateral dimension within a range of any high value and low value selected from these values.

A method of additive manufacturing with an additive manufacturing material and embedded short-chopped fibers can include the step of providing an extruder comprising a nozzle having a nozzle flow channel defined by a channel wall. The nozzle flow channel has a longitudinal center axis $A_{FC}$, a diameter $D_{FC}$, and a length $L_{FC}$, an input end and an opposing output end. The nozzle flow channel is fluidly coupled at the input end to feeding means through which additive manufacturing material and short-chopped fibers are to be provided to the extruder. The nozzle includes a plurality of spaced apart elongated aligning structures distributed inside the nozzle flow channel and parallel to the longitudinal center axis. The aligning structures have a length $L_{AS}$, a width $W_{AS}$ and a thickness $T_{AS}$, and define alignment flow channels within the nozzle flow channel.

A bead of the additive manufacturing material and short-chopped fibers is guided from the input end to the output end of the nozzle flow channel through the alignment flow channels, to align the orientations of the short-chopped fiber with the longitudinal axis center axis of the channel and create an aligned bead. The aligned bead is extruded through the output end, causing the aligned bead to be deposited as part of a layer of an object being formed by the additive manufacturing system.

A method of making a nozzle for additive manufacturing with an additive manufacturing material and embedded short-chopped fibers can include the step of providing a test nozzle having a test flow channel having a diameter $D_{TFC}$. An additive manufacturing material and short-chopped fibers are flowed through the test flow channel of the test nozzle. An extruded bead of the additive manufacturing material and short-chopped fibers is drawn, where the bead has a core of additive manufacturing material and randomized short-chopped fibers, and a skin comprising aligned short chop fibers. A thickness of the skin $T_{SK}$ is measured.

An additive manufacturing nozzle having an additive manufacturing flow channel defined by a channel wall is created. The nozzle flow channel has a longitudinal center axis, a diameter $D_{MFC}$, a circumference $C_{MFC}$, and a length $L_{MFC}$, an input end and an opposing output end. The manufacturing nozzle flow channel is fluidly coupled at the input end to feeding means through which additive manufacturing material and short-chopped fibers are to be provided to the extruder. The additive manufacturing nozzle includes a plurality of spaced apart elongated aligning structures distributed inside the manufacturing nozzle flow channel and parallel to the longitudinal center axis. The aligning structures have a length $L_{AS}$, a width $W_{AS}$ and a thickness $T_{AS}$, and defining alignment flow channels within the nozzle flow channel having a width $W_{AFC}$, with a plurality of the aligning structures distributed inside the flow channel, parallel to the longitudinal center axis. $W_{AFC}$ is in the range of from 0.1 to 2.5 $T_{SK}$.

There is shown in FIGS. 1-8 nozzle 10 according to the invention. The nozzle 10 includes a nozzle body 14 with a distal end 16 and a nozzle head 18 that is attached to a proximal end 16 of the nozzle body 14. The head 18 is designed to connect the nozzle 10 to other parts of the extruder assembly and can be of any suitable size and design. The nozzle body 14 has an interior wall 15 and defines an open interior flow channel 29 with a flow channel inlet 41 and a flow channel outlet 42, a diameter $D_{FC}$ and a long axis $A_{FC}$ 15. Within the flow channel 29 are a plurality of concentric alignment flow tubes about the long axis $A_{FC}$ 17 comprising innermost alignment flow tube 30, middle alignment flow tube 34, and laterally outermost alignment flow tube 38. More or fewer alignment flow tubes are possible.

Figure 5:
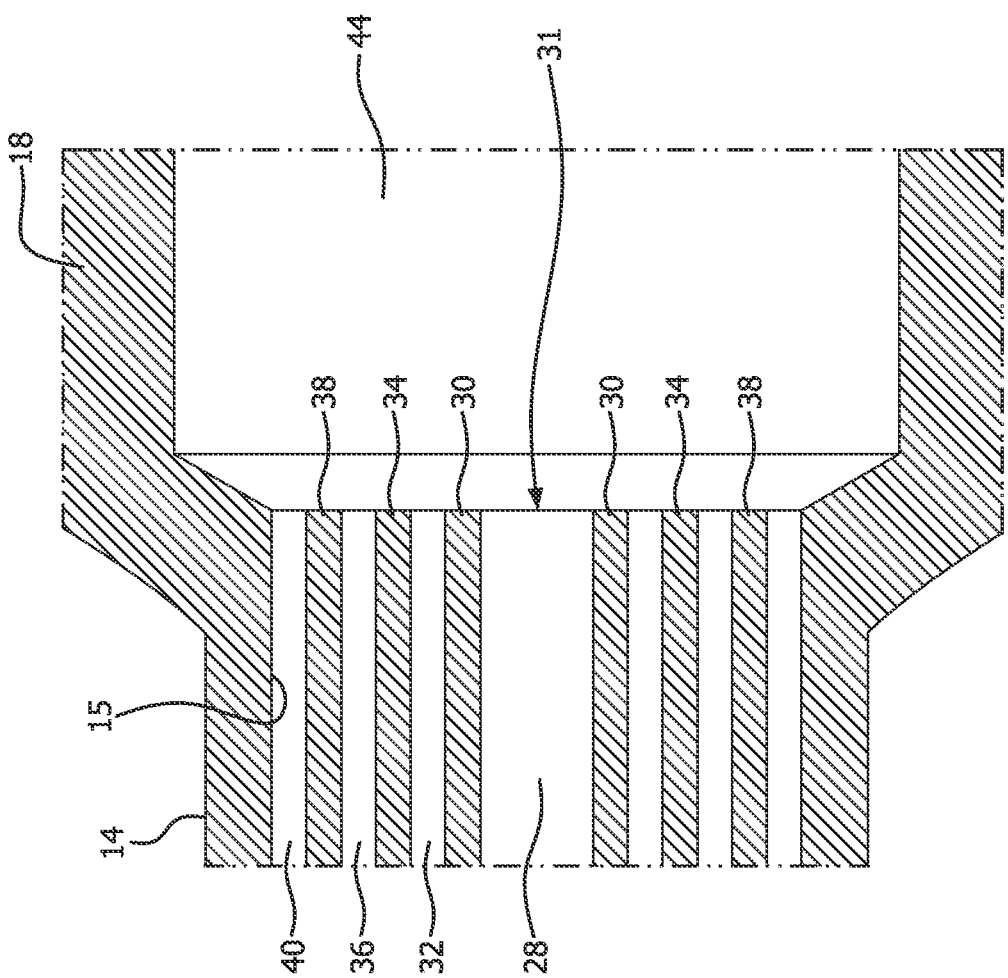
FIG. 5 is an expanded view of area FIG. 5 in FIG. 3.
Figure 6:
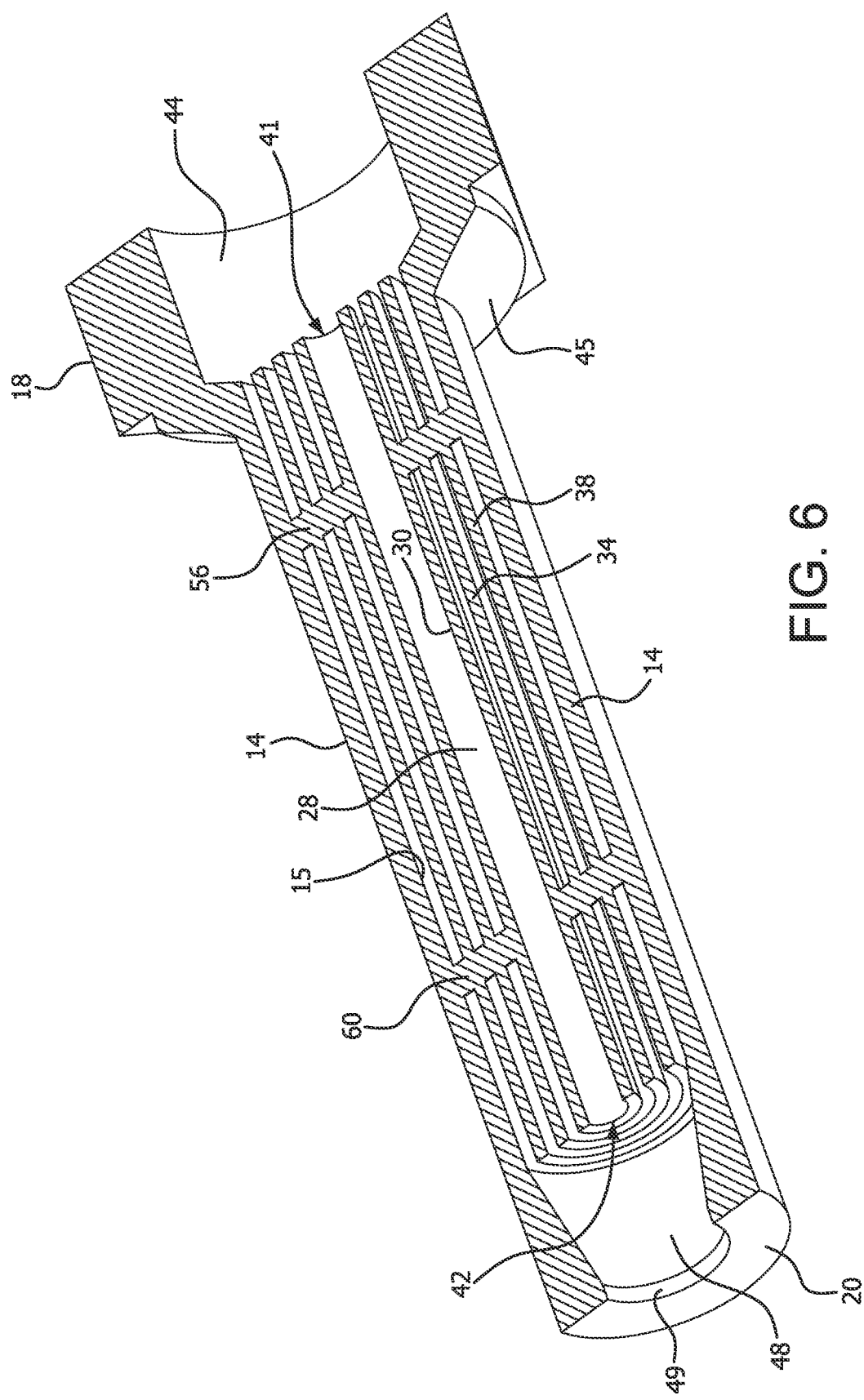
FIG. 6 is a perspective view of the cross-section of FIG. 3.
Figure 7:
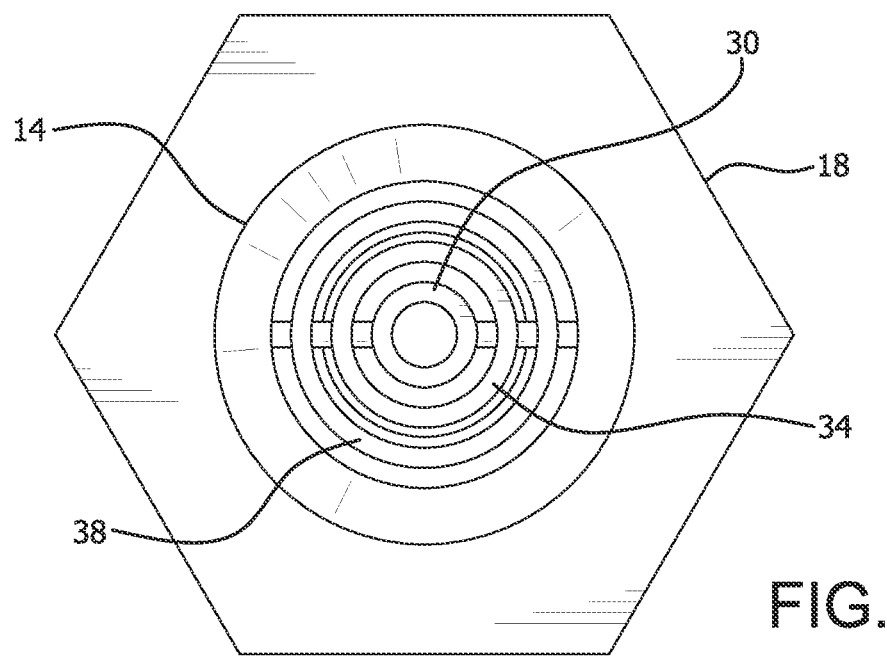
FIG. 7 is a top plan view.
Figure 8:
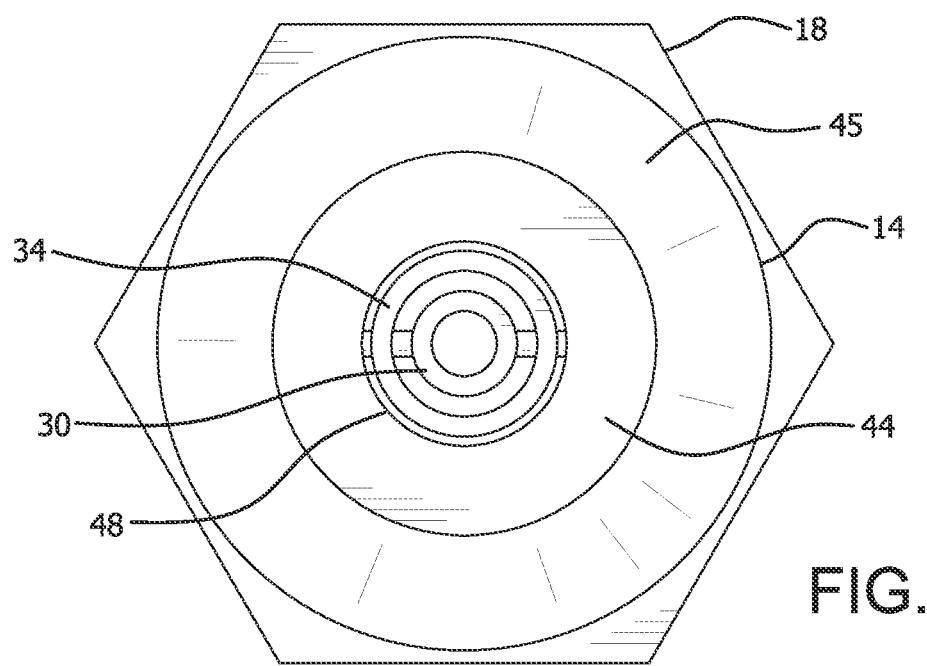
FIG. 8 is a bottom view.

The concentric alignment flow tubes define open interior spaces which serve as alignment flow channels. The innermost flow tube 30 defines a tubular alignment flow channel 28 (FIG. 5). The middle flow tube 34 together with the innermost flow tube 30 defines an annular alignment flow channel 32. The outermost flow tube 38 and the middle flow tube 34 define an annular alignment flow channel 36. The nozzle body 14 and the outermost flow tube 38 define still another alignment flow channel 40. The alignment flow tubes can be secured within the flow channel 29 by any suitable means, such as supporting brackets 56 and 60. Other supporting structure is possible.

The dimensions of the concentric alignment flow tubes and respective alignment flow channels can vary. The width or thickness of the alignment flow tubes $W_{AS}$ and the width or thickness of the respective alignment flow channels $W_{AFC}$ are selected to provide an aligning flow shear during the flow of the additive manufacturing material and the short-chopped fibers through the alignment flow channels. The shear force acts to straighten and align the short-chopped fibers in the direction of flow, parallel to the axis $A_{FC}$.

The head 18 can be adapted to connect the nozzle 10 to the extruder system and therefore can have differing sizes and shapes. The nozzle body 14 can have a compression zone 48 with conical side walls 52 to apply pressure to the additive manufacturing material as it progresses through the nozzle body 14 to an additive material exit opening 49 at the distal end 20. The head 18 can have an additive material inlet 44 and a neck portion 45 such that the additive material inlet 44 communicates with the flow channel 29 and the additive material exit opening 49 at a distal end of the nozzle body 14.

Figure 9:
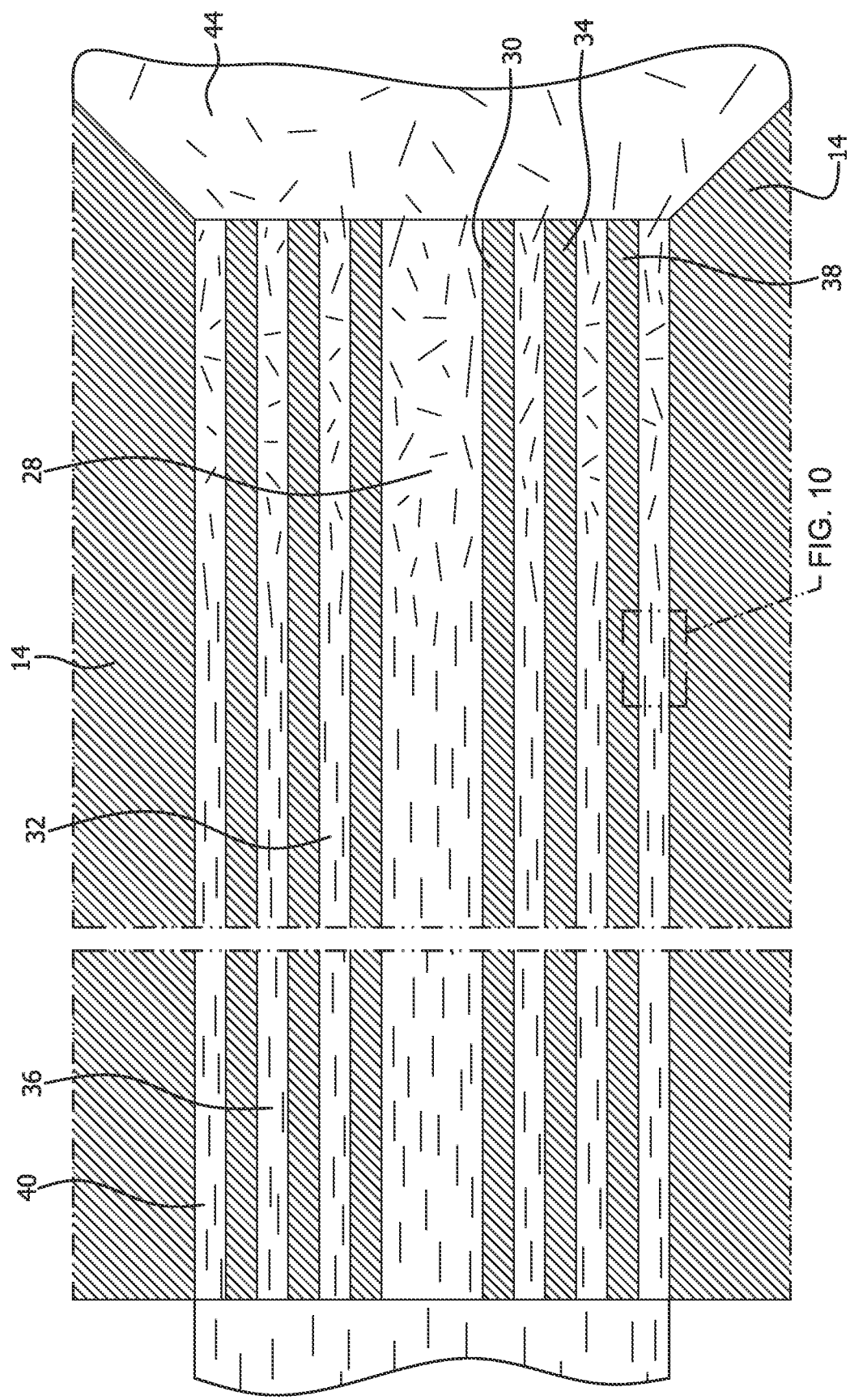
FIG. 9 is a cross-section of a highly aligned fiber nozzle in operation.
Figure 10:
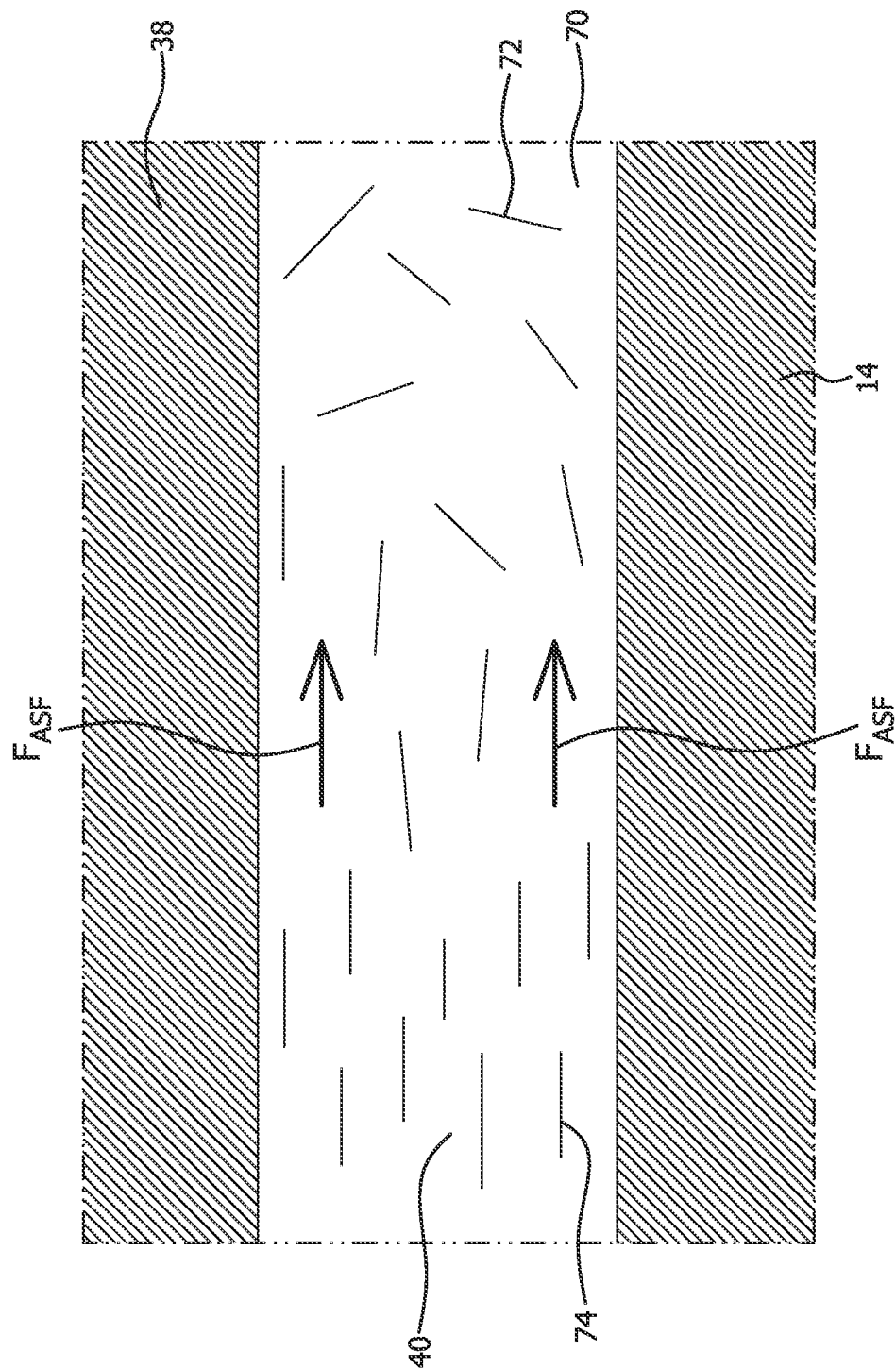
FIG. 10 is an expanded area FIG. 10 in FIG. 9.
Figure 11:
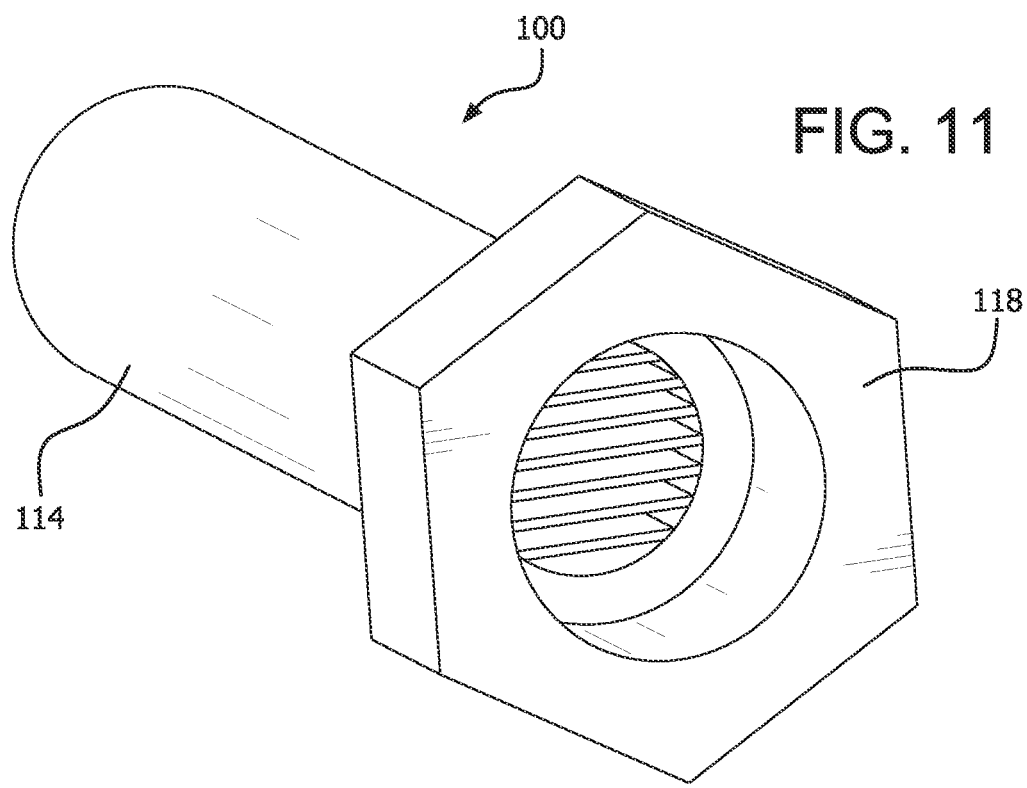
FIG. 11 is a top perspective view of an alternative embodiment.
Figure 12:
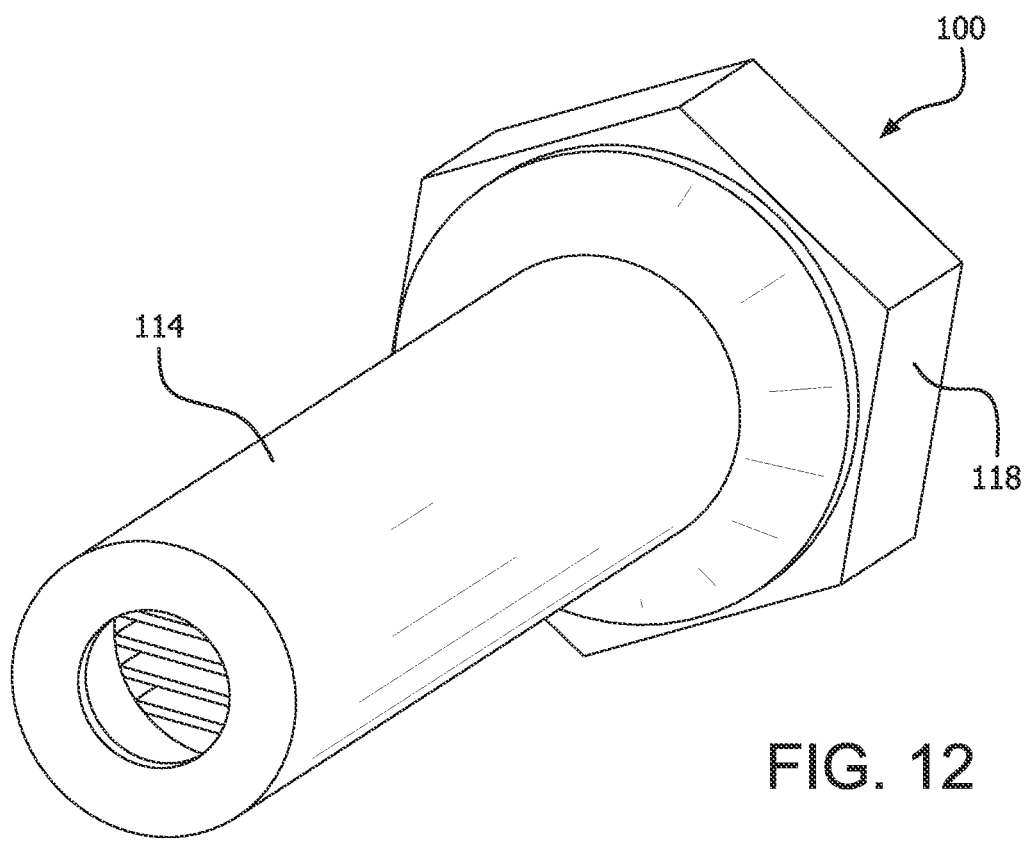
FIG. 12 is a bottom perspective view of the alternative embodiment of FIG. 11.
Figure 13:
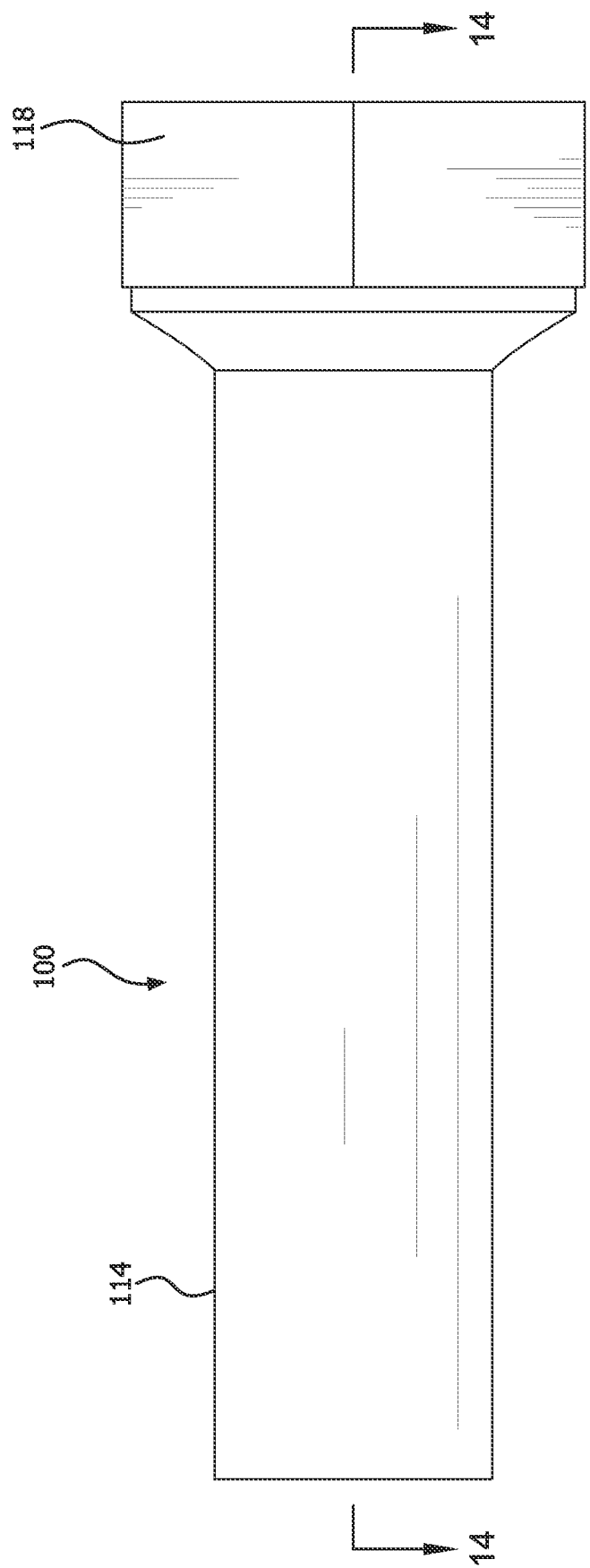
FIG. 13 is a side elevation of the alternative embodiment of FIG. 11.
Figure 14:
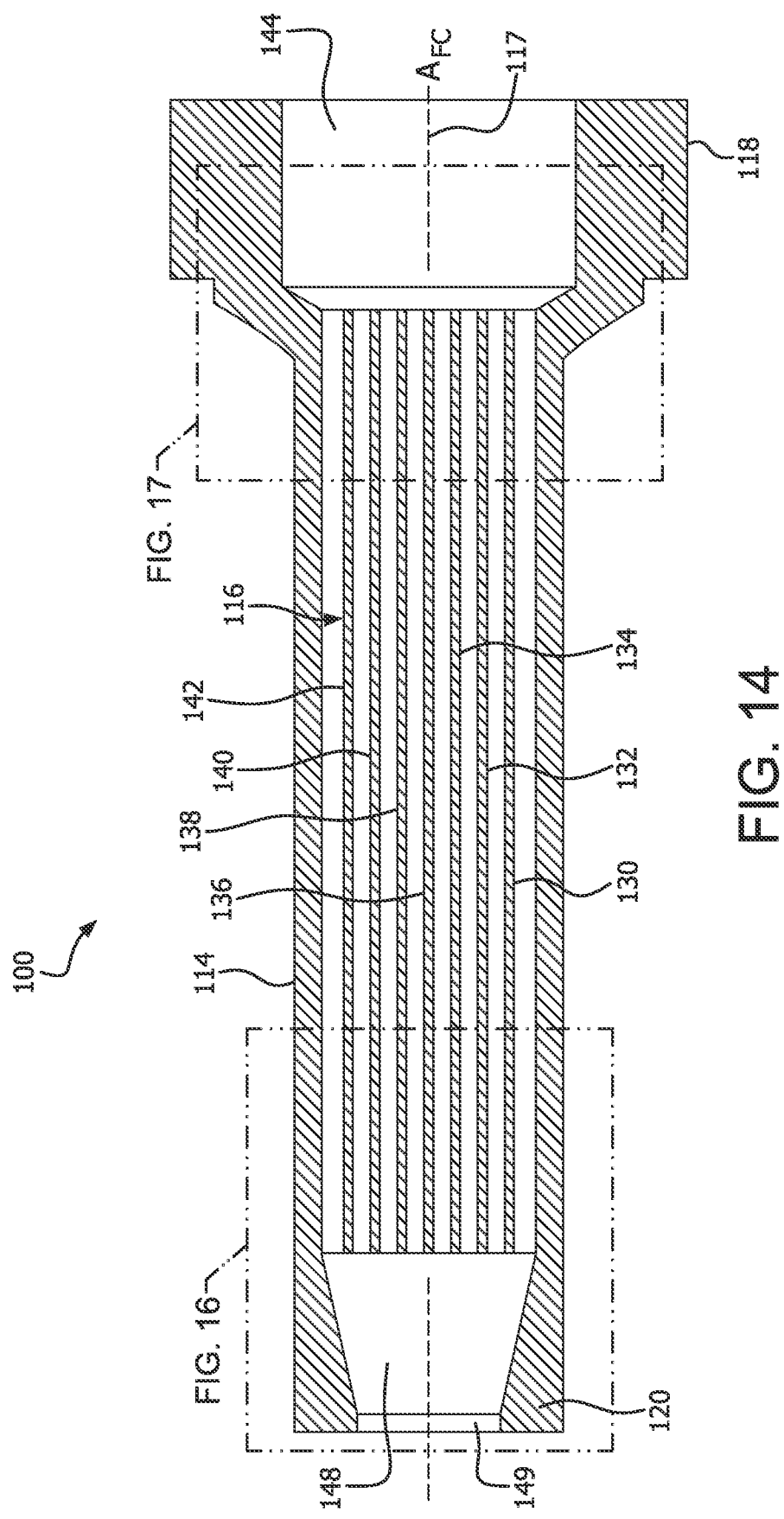
FIG. 14 is a cross-section taken along line 14-14 in FIG. 13.
Figure 15:
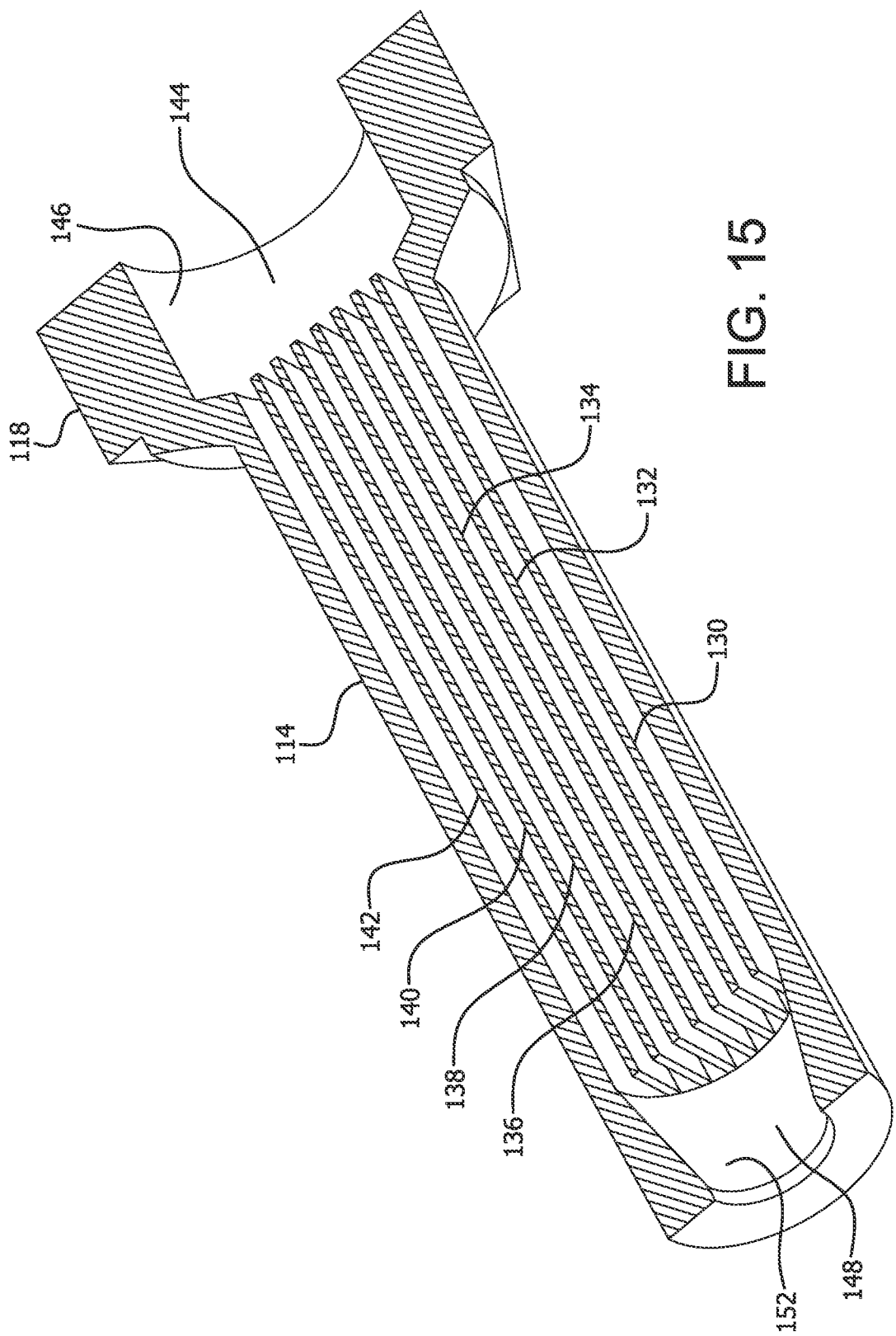
FIG. 15 is a bottom perspective view of the cross-section of FIG. 14.
Figure 16:
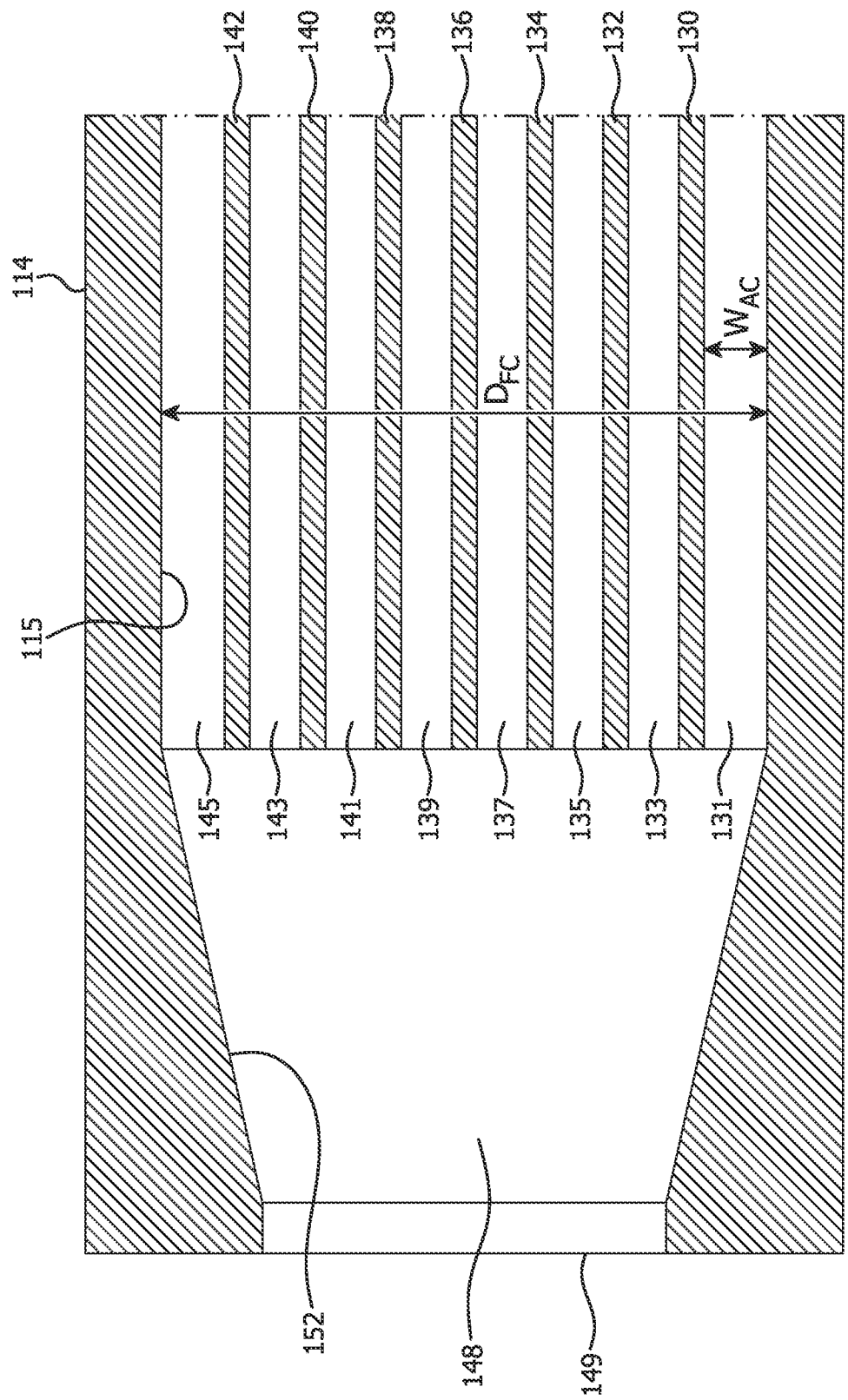
FIG. 16 is an expanded view of area FIG. 16 in FIG. 14.
Figure 17:
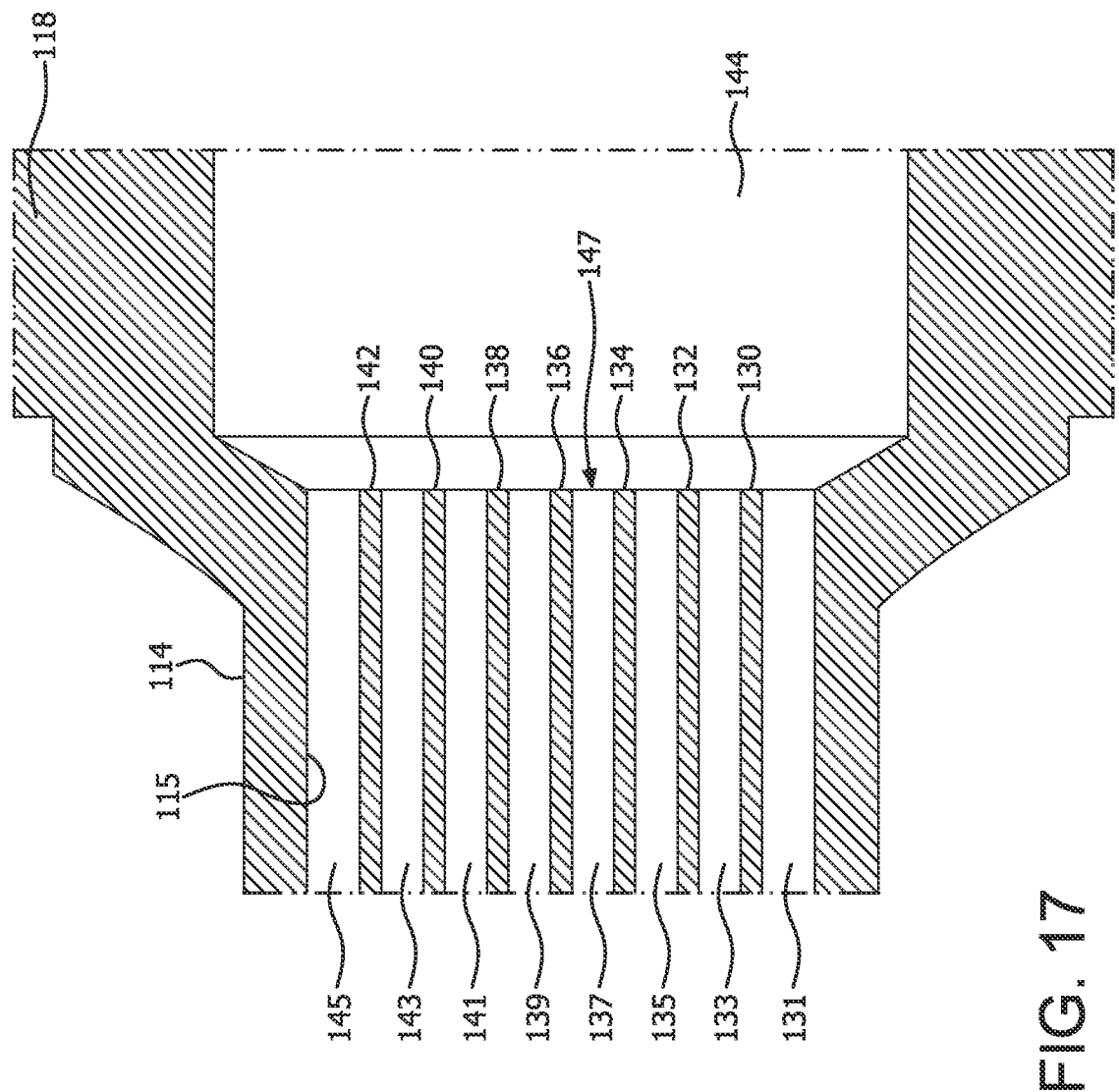
FIG. 17 is an expanded view of area FIG. 17 in FIG. 14.
Figure 18:
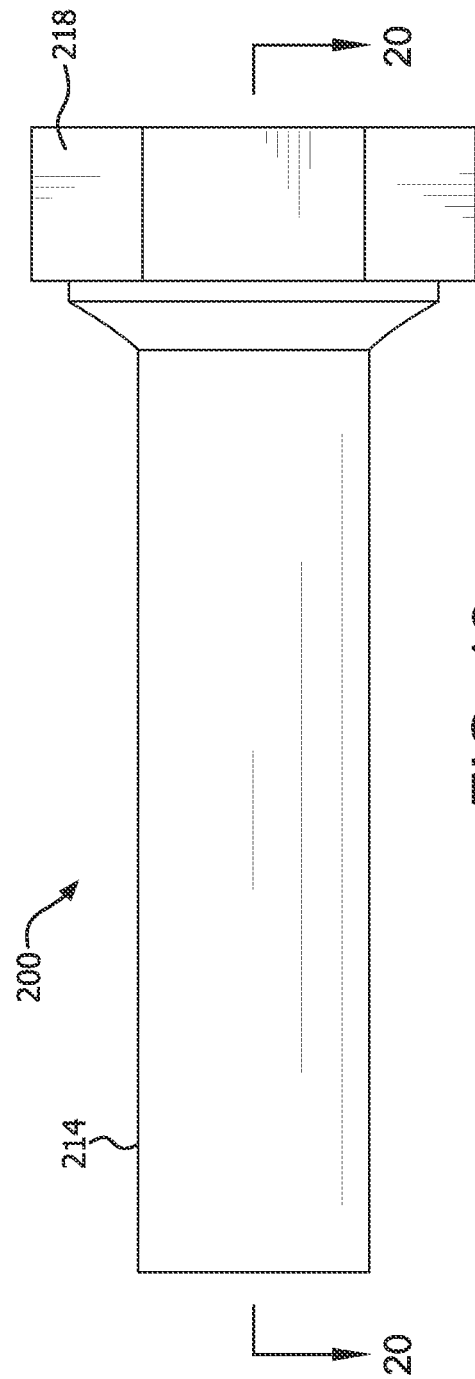
FIG. 18 a top plan view of another alternative embodiment.
Figure 19:
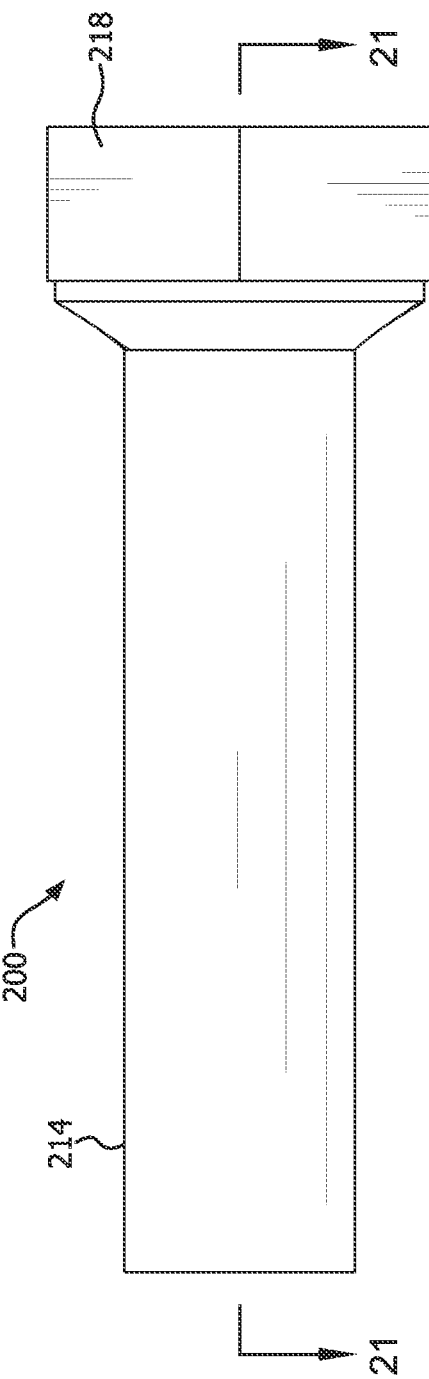
FIG. 19 is a side elevation of the alternative embodiment of FIG. 18.
Figure 20:
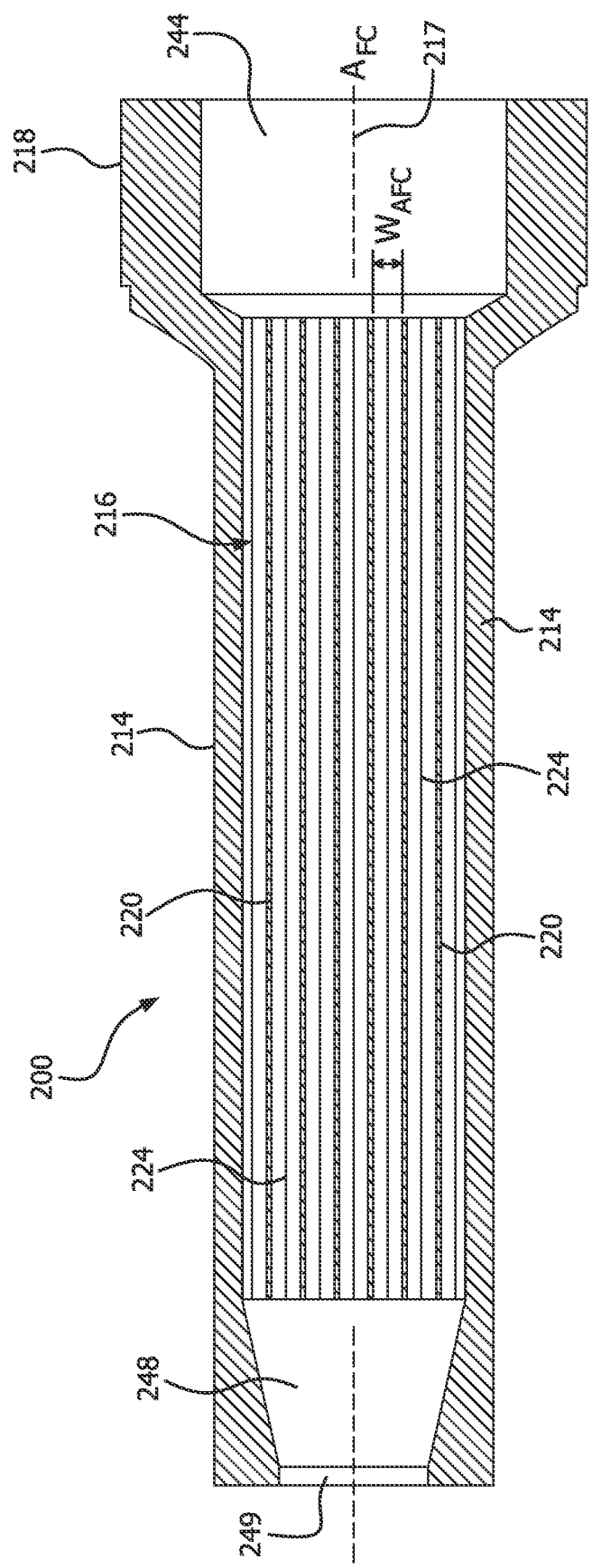
FIG. 20 is a cross section taken along line 20-20 in FIG. 18.
Figure 21:
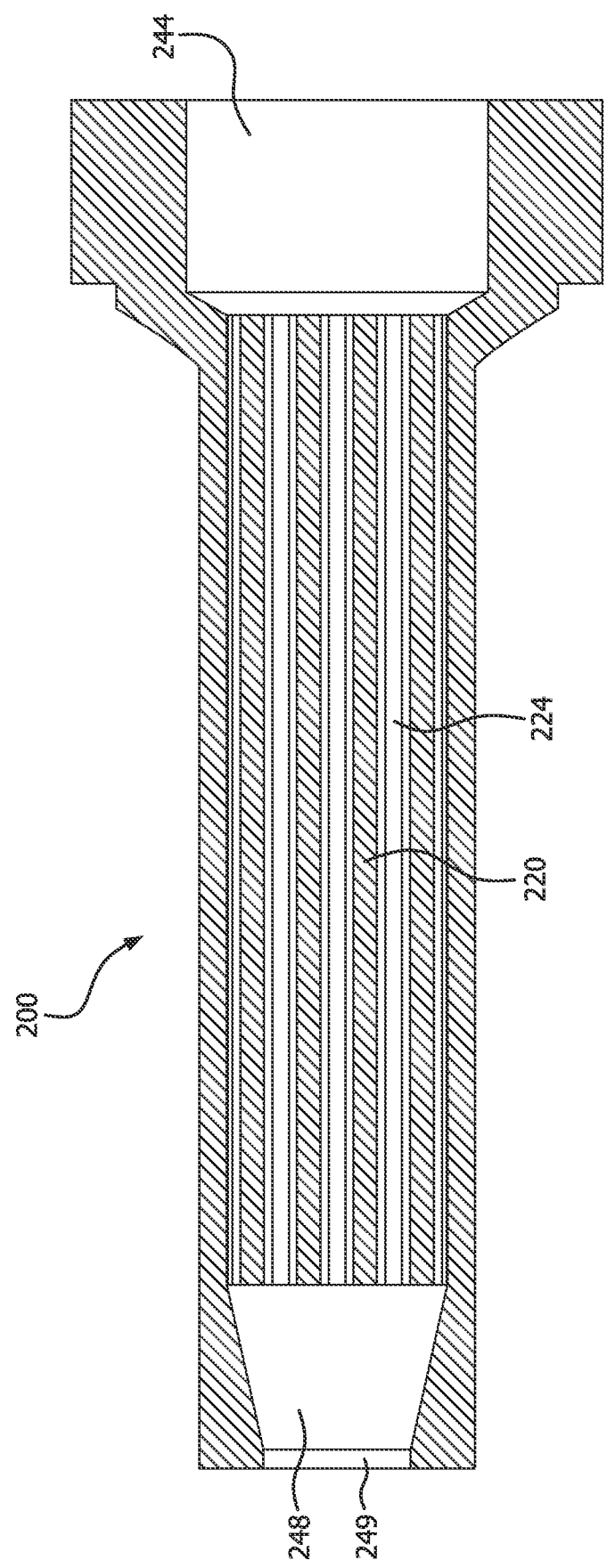
FIG. 21 is a cross section taken along line 21-21 in FIG. 19.
Figure 22:
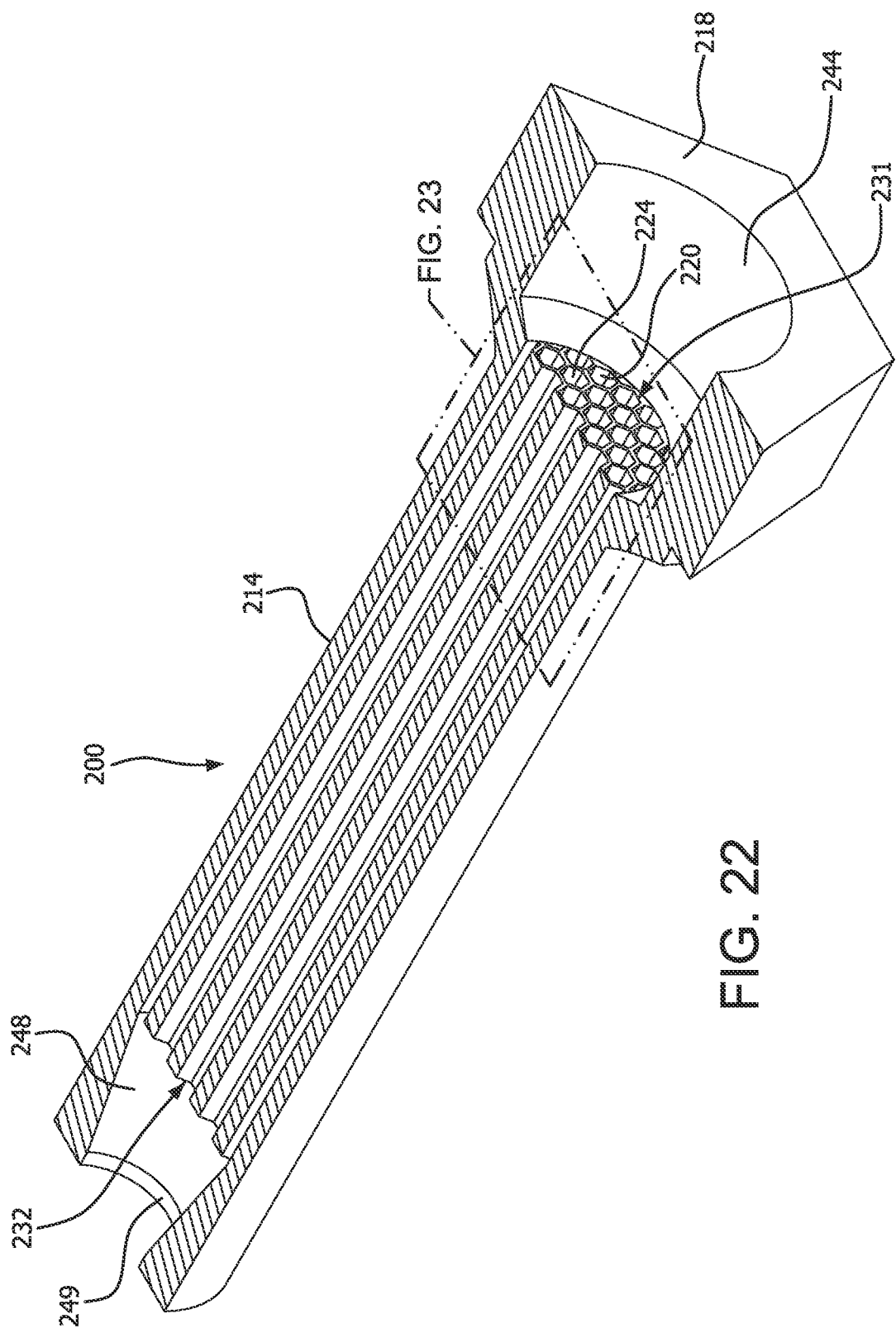
FIG. 22 is a top perspective view of the cross-section of FIG. 21.
Figure 23:
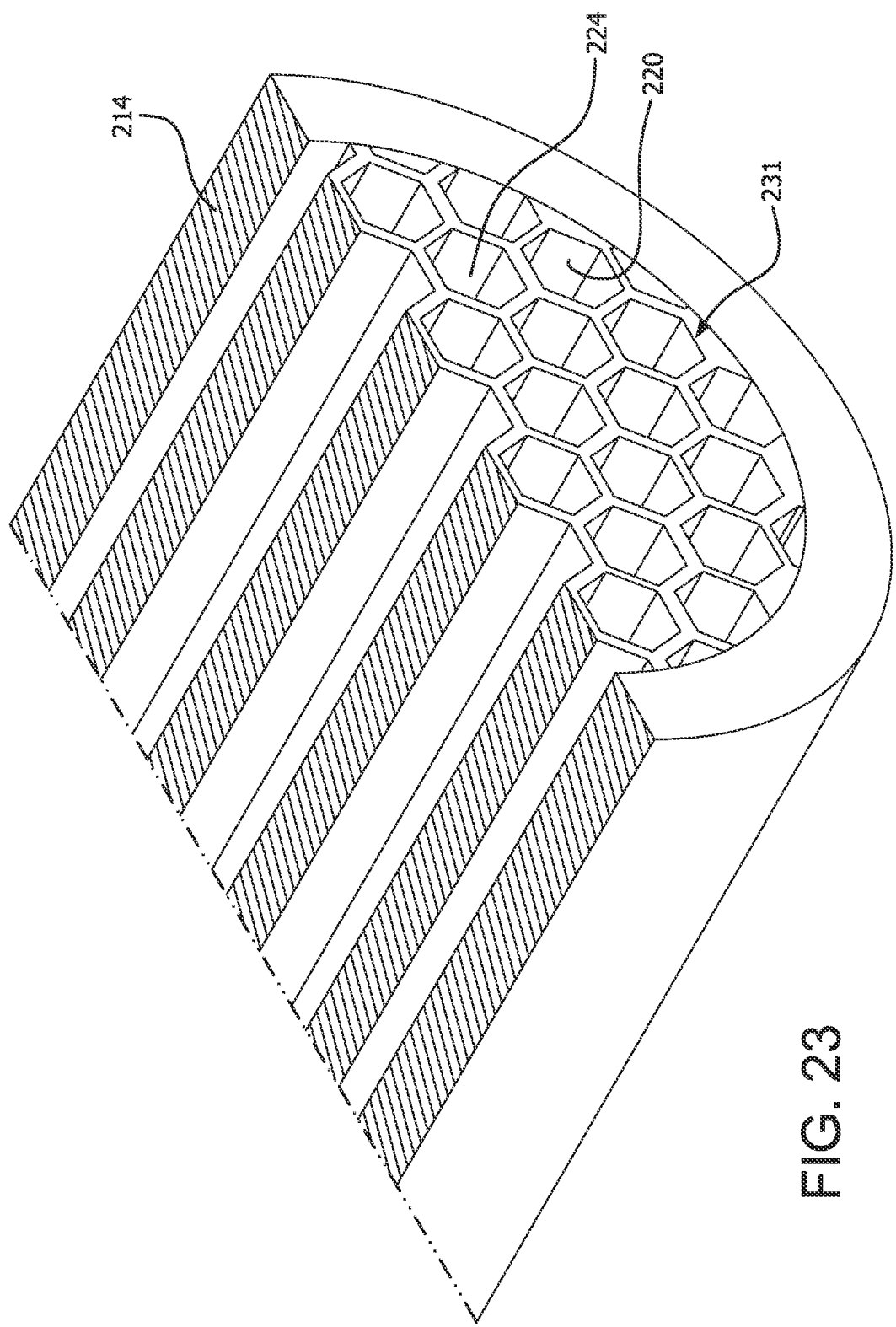
FIG. 23 is an expanded view of area FIG. 23 in FIG. 22.

Additive material and short-chopped fibers flow into the additive material inlet 44 of the head 18 and flow into the alignment flow channels 28, 32, 36 and 40. As shown in FIGS. 9-10, the flow of material through the alignment flow channels such as alignment flow channel 40 creates a shear force $F_{ASF}$ due to contact between the additive manufacturing material 70 with randomly oriented short-chopped fibers 72 and the walls of alignment flow tube 38 and the nozzle body 14. This shear force $F_{ASF}$ acts to align the short-chopped fibers 72 as they progress through the alignment flow channel 40. The width of the alignment flow channels $W_{AFC}$ is selected such that the aligning shear force $F_{ASF}$ acts upon all of the randomly oriented fibers 72 within the alignment flow channels. The shear force $F_{ASF}$ that is necessary to properly align the short-chopped fibers will depend on a variety of factors such as the additive material that is used, the material and dimensions of the short-chopped fibers, and the wall material and surface roughness of the alignment flow channels. These dimensions are determined empirically through the use of differing dimension and analysis of the orientation of the short-chopped fibers, or through testing as will be described.

Alignment flow channels with differing geometries are possible, so long as the alignment flow channels create the aligning shear force throughout the flowing additive manufacturing material with short-chopped fibers to properly align the randomly oriented short-chopped fibers into aligned short-chopped fibers. One such alternative geometry is shown in FIGS. 11-17. A nozzle 100 includes a nozzle body 114 having a flow channel 116 and a nozzle head 118. A plurality of flow aligning plates are disposed within the flow channel 116, and are connected at lateral sides to an interior wall 115 of the nozzle body 114. The flow aligning plates are parallel to each other and to a long axis $A_{FC}$ 117 of the flow channel 116. Any number of plates are possible, and the number of plates can depend on the necessary size of the flow channel 116 having a diameter $D_{FC}$ for the desired flow rate of additive material and short-chopped fibers, together with the necessary plate spacing $W_{AFC}$ to impart the necessary shear force at the walls of the plates to align the short-chopped fibers within the additive manufacturing material. The additive manufacturing nozzle 100 has plates 130, 132, 134, 136, 138, 140, and 142, however, more or fewer plates are possible. The plates define flow channels 131, 133, 135, 137, 139, 141, 143, and 145. The additive manufacturing material and short-chopped fibers flow from an inlet 144 in the head 118, through opening 144 defined by wall 146 and flow channel inlet 147, through the flow channel 116 to a compression zone 148 defined by conical wall 152 to an additive material exit opening 149 in a distal end 120 of the nozzle body 114.

Hexagonal flow channels are shown in FIGS. 18-23 in an additive manufacturing nozzle 200. The nozzle 200 has a nozzle body 214 and a nozzle head 218. The nozzle body 214 defines an open interior flow channel 216. A plurality of hexagonal alignment flow structures or conduits 220 are provided in the flow channel 216. The hexagonal alignment flow conduits 220 define a plurality of parallel hexagonal alignment flow channels 224 that are parallel to the axis $A_{FC}$ of the flow channel 216. Additive manufacturing material and short-chopped fibers enter through additive manufacturing material inlet 244 in the head 218, flows through the inlet 231 of the flow channel 216, through the hexagonal alignment flow channels 224 and the flow channel outlet 232 and through the compression zone 248 to the additive manufacturing material exit 249. The width of the hexagonal alignment flow channels 224 $W_{AFC}$ is selected such that additive manufacturing material and the short-chopped fibers are subjected to a sufficient shear force that the short-chopped fibers are aligned within the additive manufacturing material.

Figure 24:
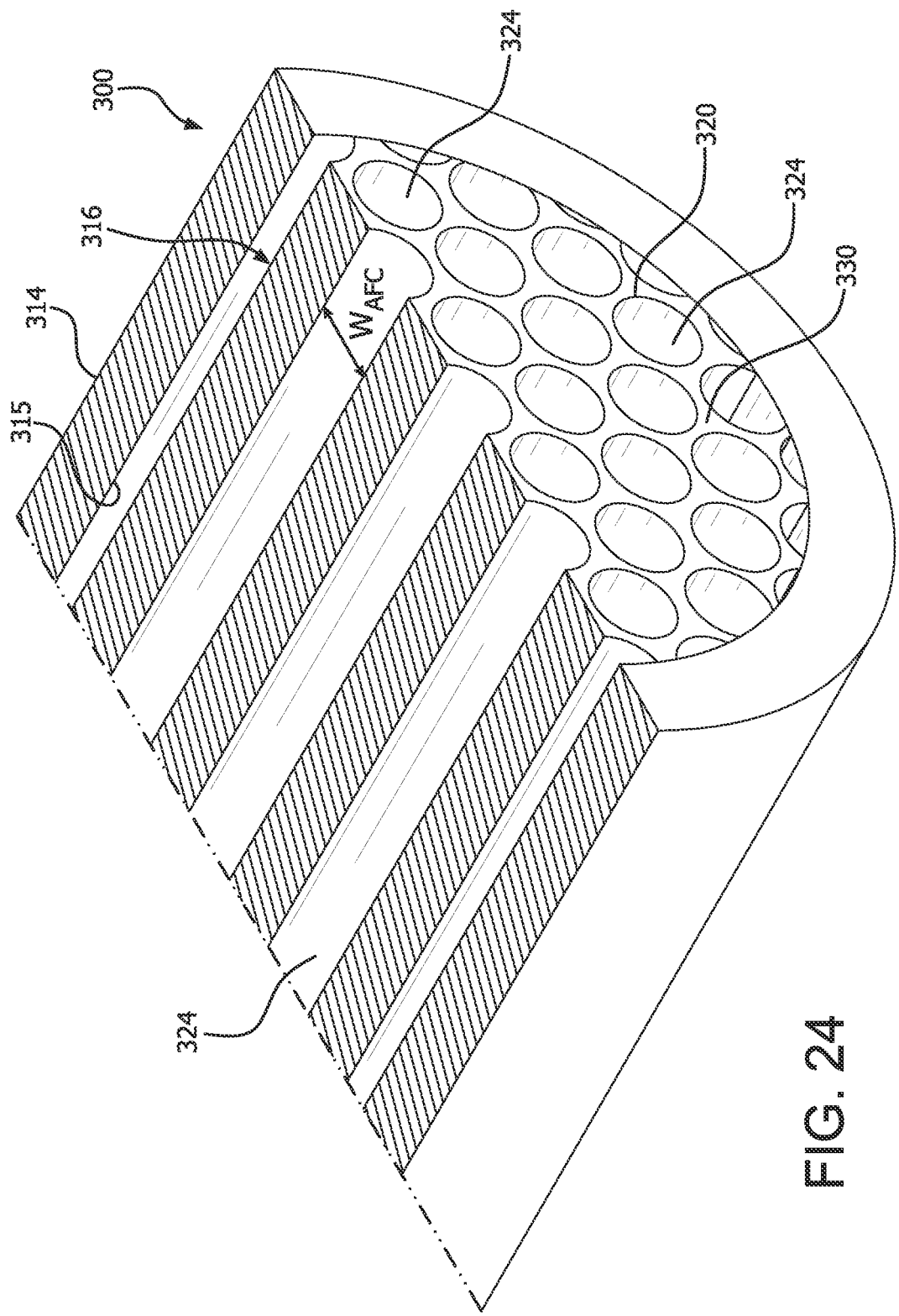
FIG. 24 is a perspective view of a cross-section of another alternative embodiment.

Parallel and adjacent tubular alignment flow channels are shown in FIG. 24 for an additive manufacturing nozzle 300. The nozzle 300 has a nozzle body 314 with an interior wall 315 defining a flow channel 316. A plurality of parallel flow alignment tubes 320 can be provided and define a plurality of flow alignment channels 324. The flow alignment tubes 320 can be fashioned from a monolithic tube matrix material 330 that is secured within the flow channel 316. The width of the tubular alignment flow channels 324 $W_{AFC}$ is selected such that additive manufacturing material and the short-chopped fibers are subjected to a sufficient shear force that the short-chopped fibers are aligned within the additive manufacturing material as the additive manufacturing material and short-chopped fibers low through the flow alignment channels 324 of the flow alignment tubes 320.

Figure 25:
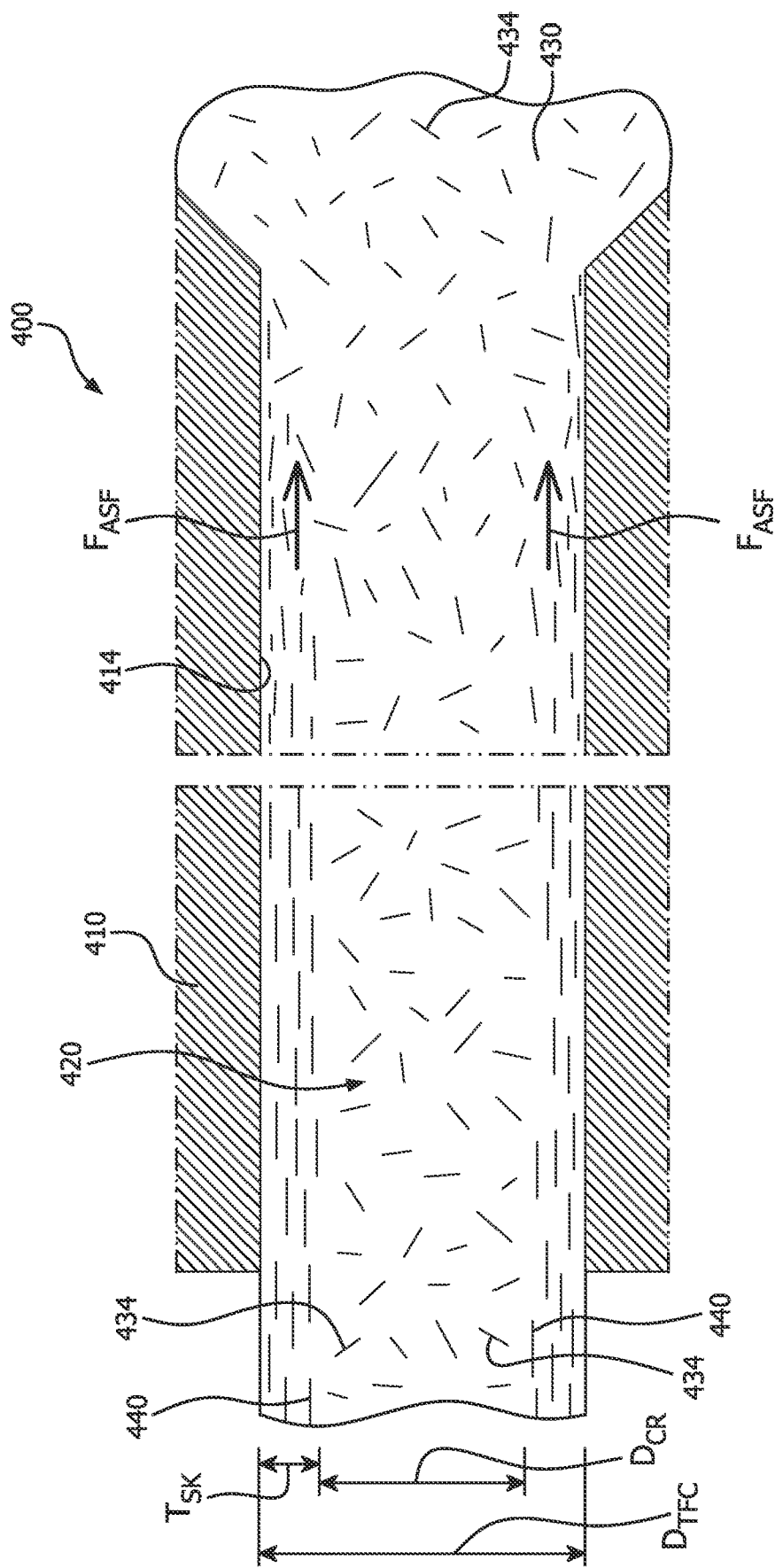
FIG. 25 is a cross section illustrating operation of a test nozzle.

The width of the flow alignment channels must be small enough to subject the additive manufacturing material and short-chopped fibers flowing through the channels to a sufficient shear force that is imparted by the walls forming the channels such that the short-chopped fibers are aligned as the flow progresses through the channels. The channels should not be unduly narrow, however, as this will impede the flow of the additive manufacturing material through the nozzle. The proper dimensions can be determined empirically. There is shown in FIG. 25 a method of testing for an appropriate alignment flow channel width. A test nozzle 400 with a nozzle body 410 having an interior wall 414 defines an open interior test flow channel 420 having a diameter $D_{TFC}$. Additive manufacturing material 430 with randomly orient short-chopped fibers 434 is flowed through the test flow channel 420. The additive manufacturing material 430 and randomly oriented short-chopped fibers 434 encounter an alignment shear force indicated by arrow $F_{ASF}$ due to interactions at the interior wall 414. The alignment shear force causes randomly oriented fibers near the interior wall 414 to align into aligned fibers 440. The aligning of fibers will be limited to some distance from the interior wall 414 which can be referred to as a skin having a thickness $T_{SK}$. A core of the flowing additive manufacturing material 430 and randomly oriented fibers 434 is distanced from the interior wall 414 and is therefore not impacted sufficiently to align the fibers, and so this region having a diameter $D_{CR}$ has randomly oriented fibers 434. The extruded sample is analyzed and the thickness of the skin $T_{SK}$ is determined. The alignment flow channels are given a width based upon this skin thickness $T_{SK}$, for example from 0.1 to 2.5 $T_{SK}$.

Figure 26:
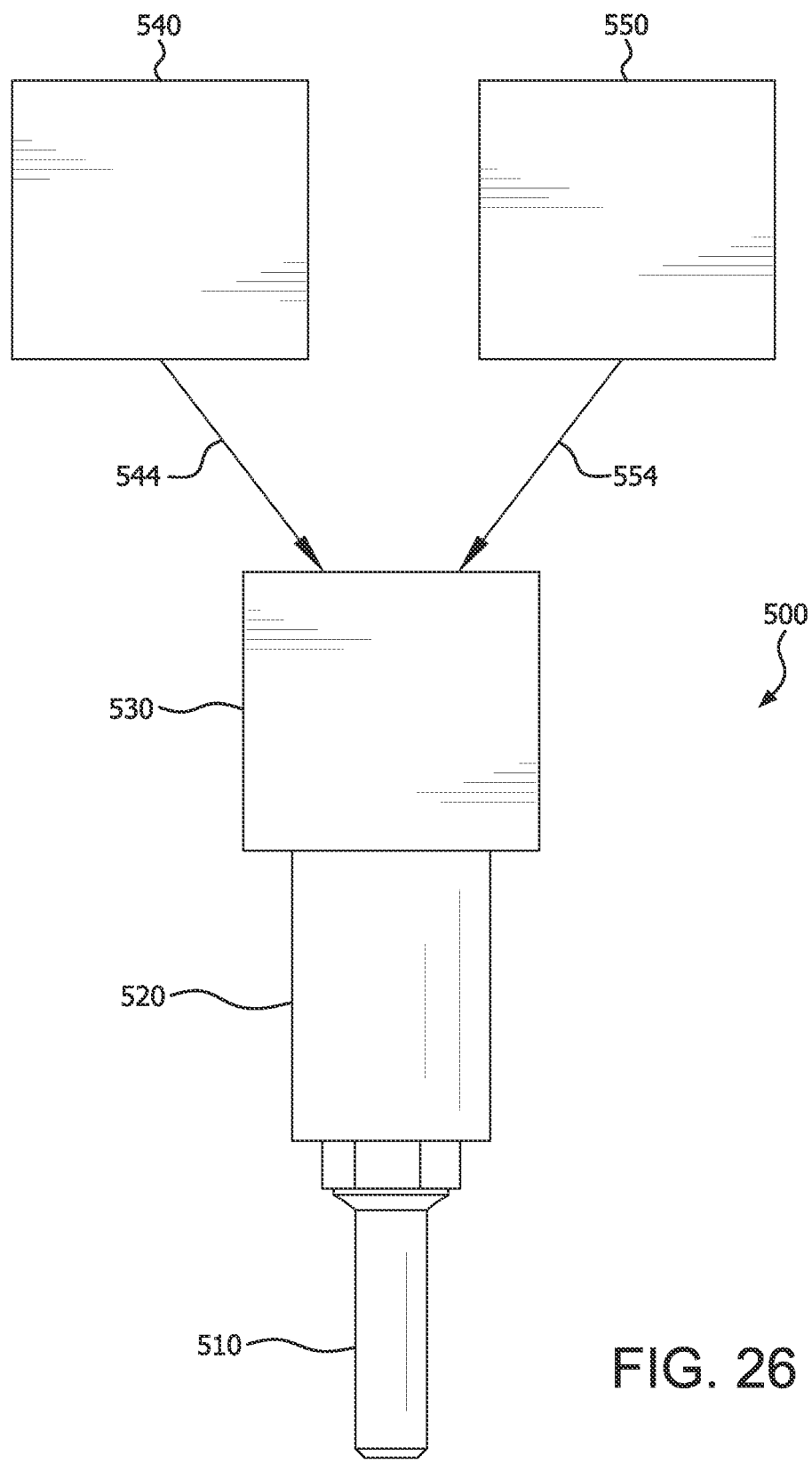
FIG. 26 is a schematic depiction of an extruder system.

The nozzle of the invention can be used with a variety of different extruder systems for additive manufacturing with short-chopped fibers. A generalized depiction of an extruder system 500 is show in FIG. 26. The extruder system 500 includes a nozzle 510, a barrel 520 and a mixing manifold 530. A source of additive manufacturing material 540 provides additive manufacturing material though connection 544 to the mixing manifold 530. A source of short-chopped fibers 550 provides short-chopped fiber through a connection 554 to the mixing manifold 530. Other components of additive manufacturing are well known in the art.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. An additive manufacturing system for a bead comprising an additive manufacturing material and embedded short-chopped fibers, comprising:

an extruder comprising a nozzle having a nozzle flow channel defined by a channel wall, the nozzle flow channel having a longitudinal center axis, a diameter $D_{FC}$, and a length $L_{FC}$, an input end and an opposing output end, the nozzle flow channel being fluidly coupled at the input end to feeding means through which additive manufacturing material and short-chopped fibers are to be provided to the extruder, the nozzle comprising a plurality of spaced apart elongated aligning structures distributed inside the nozzle flow channel and parallel to the longitudinal center axis, the aligning structures having a length $L_{AS}$, a width $W_{AS}$ and a thickness $T_{AS}$, and defining alignment flow channels within the nozzle flow channel, where the bead has a skin thickness $T_{SK}$, and the alignment flow channels have a lateral dimension of from 0.1 to 2.5 $T_{SK}$;

wherein the nozzle is configured to guide a bead of the additive manufacturing material and short-chopped fibers from the input end to the output end of the nozzle flow channel through the alignment flow channels, to align the orientations of the short-chopped fiber with the longitudinal axis center axis of the channel and create an aligned bead, and extrude the aligned bead through the output end, causing the aligned bead to be deposited as part of a layer of an object being formed by the additive manufacturing system.

2. The system of claim 1, wherein the nozzle flow channel is tubular.

3. The system of claim 1, wherein the length of the aligning structures $L_{AS}$ is from 20% to 100% of the length $L_{FC}$ of the nozzle flow channel.

4. The system of claim 1, wherein the width Was of the aligning structures is from 10% to 100% of the flow channel diameter $D_{FC}$.

5. The system of claim 1, wherein the nozzle comprises 2-100 alignment flow channels.

6. The system of claim 1, wherein the aligning structures are concentric tubes.

7. The system of claim 1, wherein the aligning structures comprise parallel plates.

8. The system of claim 1, wherein the aligning structures comprise conduits, each conduit defining an alignment flow channel, the alignment flow channels being parallel to each other.

9. The system of claim 7, wherein the conduits comprise adjacent polygonal conduits.

10. The system of claim 7, wherein the conduits comprise a plurality of adjacent tubes.

11. A nozzle for additive manufacturing and producing a bead comprising an additive manufacturing material and embedded short-chopped fibers, comprising a nozzle flow channel defined by a channel wall, the nozzle flow channel having a longitudinal center axis, a diameter $D_{FC}$, and a length $L_{FC}$, an input end and an opposing output end, the nozzle comprising a plurality of spaced apart elongated aligning structures distributed inside the nozzle flow channel and parallel to the longitudinal center axis, the aligning structures having a length $L_{AS}$, a width Was and a thickness $T_{AS}$, and defining alignment flow channels within the nozzle flow channel, wherein when the bead has a skin thickness $T_{SK}$ the alignment flow channels have a lateral dimension of from 0.1 to 2.5 $T_{SK}$.

* * * * *